US012700047B2

(12) United States Patent
Perecharla et al.

(10) Patent No.: US 12,700,047 B2
(45) Date of Patent: Aug. 4, 2026

(54) ANALYZING AND ENHANCING PERFORMANCE OF OILFIELD ASSETS

(71) Applicant: Schlumberger Technology Corporation, Sugar Land, TX (US)

(72) Inventors: Jaganvas Perecharla, Sugar Land, TX (US); Rajarshi Banerjee, Houston, TX (US); Priyavrat Shukla, Richmond, TX (US); Manas Kumar Koley, Katy, TX (US); Kaustubh Shrivastava, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/833,598

(22) PCT Filed: Mar. 7, 2023

(86) PCT No.: PCT/US2023/063840
§ 371 (c)(1),
(2) Date: Jul. 26, 2024

(87) PCT Pub. No.: WO2023/172897
PCT Pub. Date: Sep. 14, 2023

(65) Prior Publication Data
US 2025/0117864 A1     Apr. 10, 2025

Related U.S. Application Data

(60) Provisional application No. 63/269,010, filed on Mar. 8, 2022.

(51) Int. Cl.
*G06Q 50/02*          (2024.01)
*G06Q 10/0639*       (2023.01)

(52) U.S. Cl.
CPC ....... *G06Q 50/02* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 7,069,148 B2 | 6/2006 | Thambynayagam | |
| 7,363,162 B2 | 4/2008 | Thambynayagam | |

(Continued)

OTHER PUBLICATIONS

Yuhun, P., O. O. Awoleke, and S. D. Goddard. "Using rate transient analysis and bayesian algorithms for reservoir characterization in unconventional gas wells during linear flow." SPE Reservoir Evaluation & Engineering 24.04 (2021): 733-751. (Year: 2021).*

(Continued)

*Primary Examiner* — Sara Grace Brown
(74) *Attorney, Agent, or Firm* — Kyle R. Miller

(57)          ABSTRACT

Techniques for analyzing and enhancing performance of oilfield assets are presented. The techniques can include: receiving oilfield data input; projecting production for multiple wells in a field based at least in part on the oilfield data input and using one or more of Decline Curve Analysis (DCA), a machine learning model, Rate Transient Analysis (RTA); aggregating the projected production for the plurality of wells; identifying one or more wells for additional completion operations; determining one or more completion operations to conduct for the one or more identified wells, wherein the determining uses a machine learning model to forecast results of the one or more completion operations; computing, for the one or more identified wells, generational analytics related to well behaviors and based at least in part on respective well ages; and displaying, for the one or more identified wells, analytics, recommendations, or projections using a display dashboard.

18 Claims, 22 Drawing Sheets

(56)     References Cited

U.S. PATENT DOCUMENTS

| 8,145,463 | B2 | | 3/2012 | Thambynayagam | |
| 2014/0297235 | A1 | * | 10/2014 | Arora | G06N 7/01 |
| | | | | | 703/2 |
| 2017/0364795 | A1 | * | 12/2017 | Anderson | G06N 20/10 |
| 2018/0202264 | A1 | | 7/2018 | Sarduy | |
| 2018/0335538 | A1 | * | 11/2018 | Dupont | G06N 20/20 |
| 2019/0361146 | A1 | | 11/2019 | Roth | |
| 2022/0154556 | A1 | * | 5/2022 | Purkayastha | G06F 18/24 |
| 2023/0142526 | A1 | * | 5/2023 | Chen | E21B 43/00 |
| | | | | | 703/10 |
| 2023/0186184 | A1 | * | 6/2023 | Basri | G06N 7/01 |
| | | | | | 166/250.01 |
| 2023/0204815 | A1 | * | 6/2023 | Prochnow | G06N 20/20 |
| | | | | | 702/12 |

OTHER PUBLICATIONS

Search Report and Written Opinion of International Patent Application No. PCT/US2023/063850 dated Jun. 6, 2023, 10 pages.
Miller, G. et al., "Parent Well Refracturing: Economic Safety Nets in an Uneconomic Market", SPE-180200-MS, presented at the SPE Low Perm Symposium, Denver, Colorado, 2016, 15 pages.

* cited by examiner

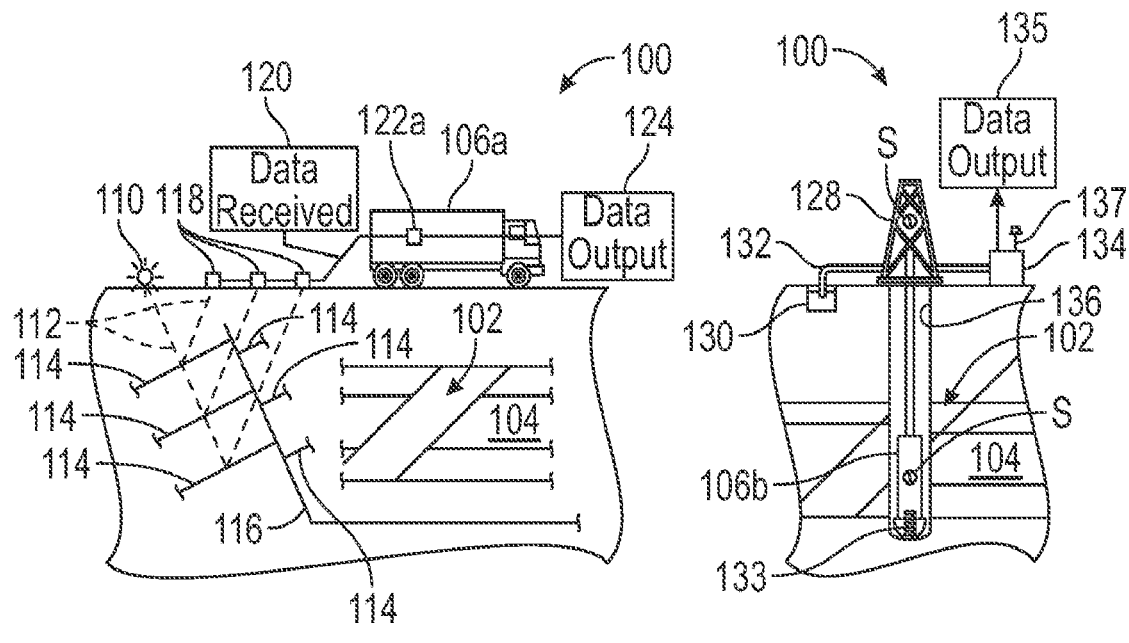
FIG. 1A          FIG. 1B
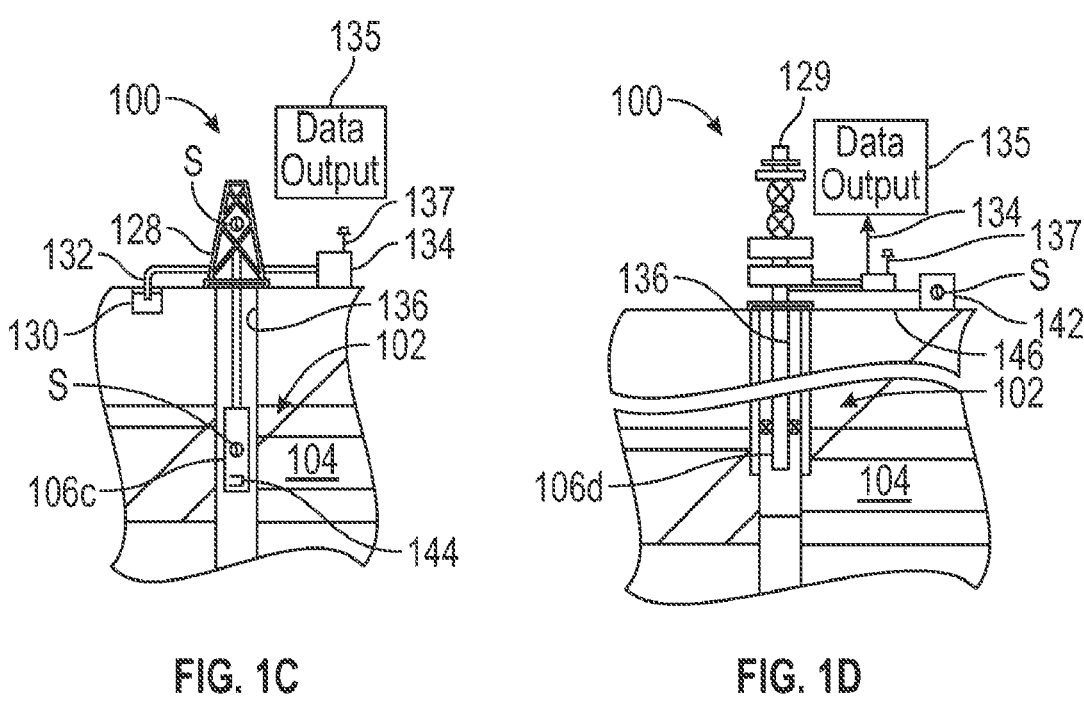
FIG. 1C          FIG. 1D

500

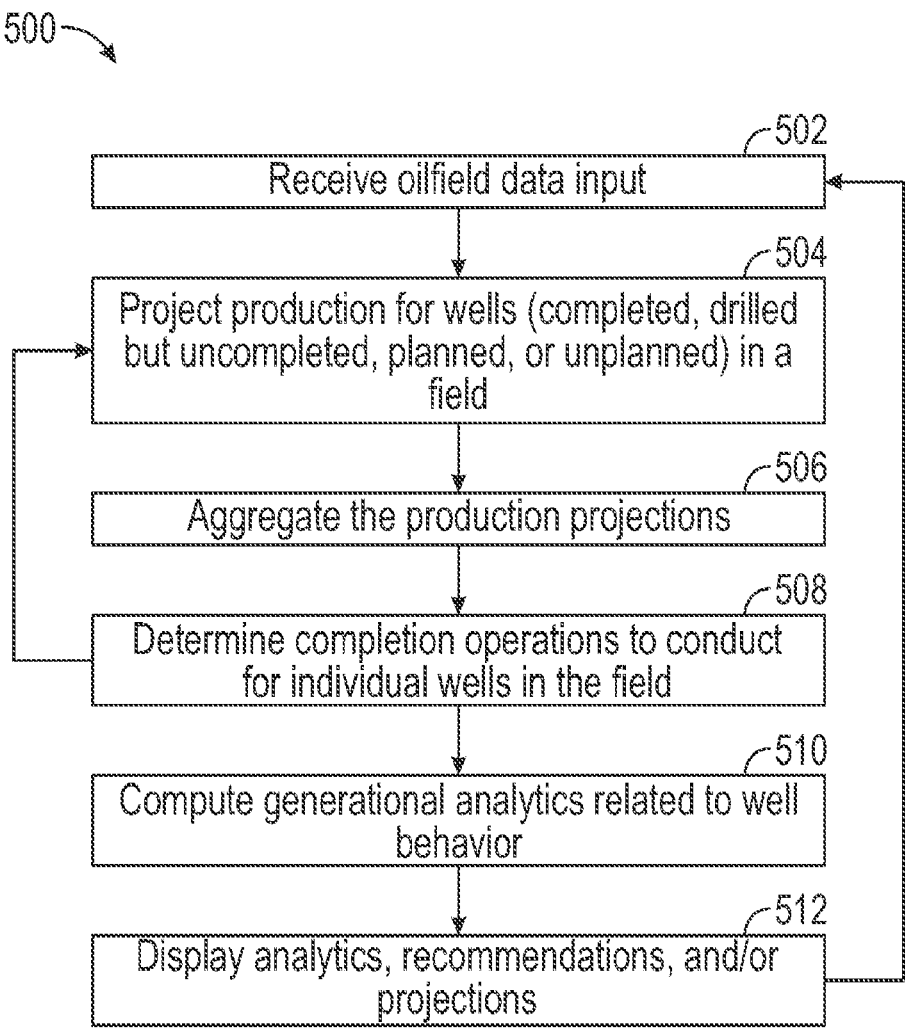

502
Receive oilfield data input

504
Project production for wells (completed, drilled but uncompleted, planned, or unplanned) in a field 506
Aggregate the production projections 508
Determine completion operations to conduct for individual wells in the field 510
Compute generational analytics related to well behavior 512
Display analytics, recommendations, and/or projections

FIG. 5

- 70 independent NN models are created
- As first two months of production are given as input total 72 months of data is used in traditional decline curve analysis type of model Single Layer NN 70 independent models are created with similar structure

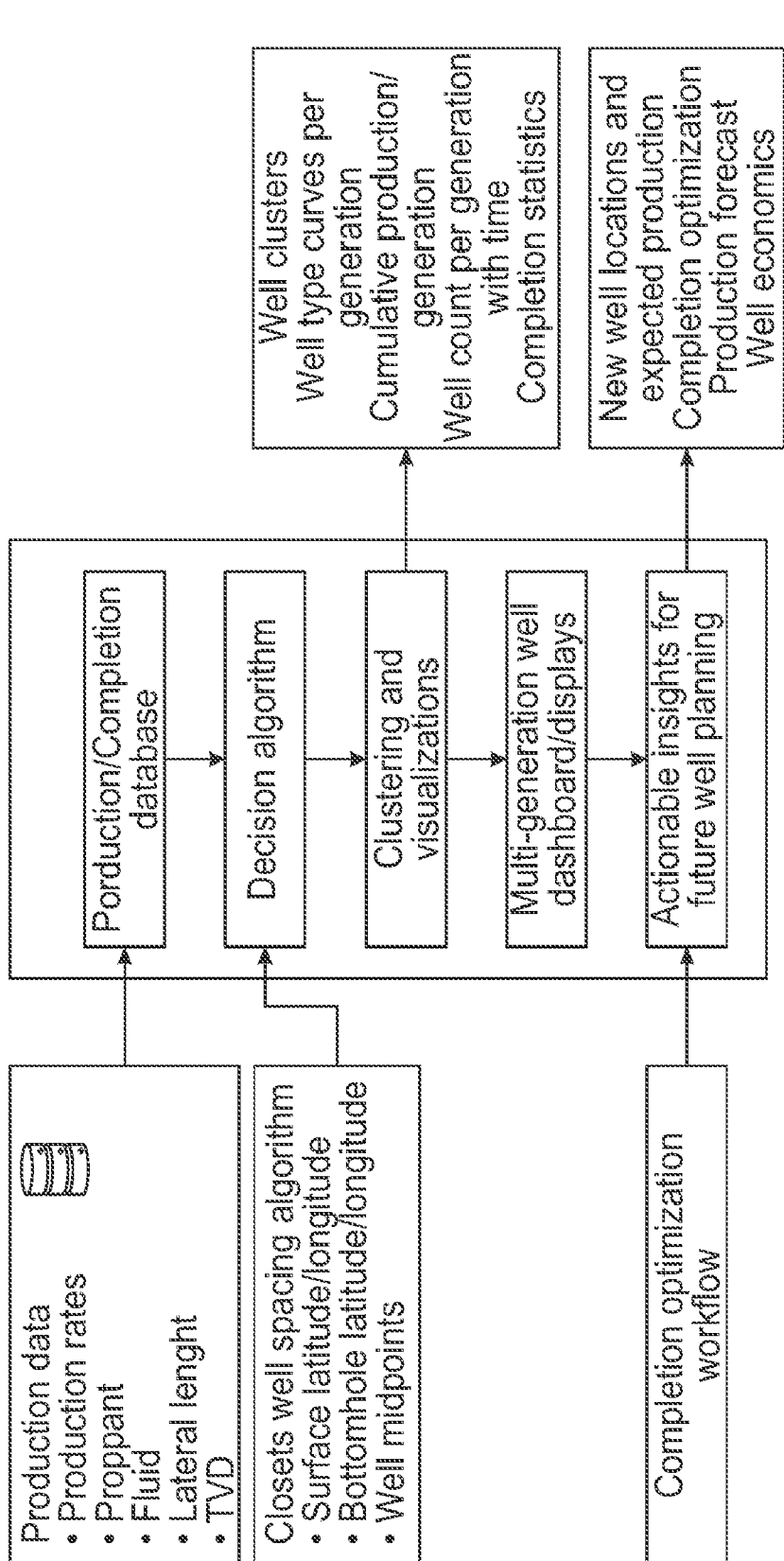

Generational analytics for well interference insights

Production data
• Production rates
• Proppant
• Fluid
• Lateral lenght
• TVD

Closets well spacing algorithm
• Surface latitude/longitude
• Bottomhole latitude/longitude
• Well midpoints Completion optimization workflow Porduction/Completion database Decision algorithm Clustering and visualizations Multi-generation well dashboard/displays Actionable insights for future well planning Well clusters
Well type curves per generation
Cumulative production/generation
Well count per generation with time
Completion statistics New well locations and expected production
Completion optimization
Production forecast
Well economics

1702
Analysis Module(s)

1704
Processor(s)

1707
Network Interface

1706
Storage Media

1708
Oilfield Completion Module(s)

1709

Computer System
1701B

Computer System
1701C

Computer System
1701D

ANALYZING AND ENHANCING PERFORMANCE OF OILFIELD ASSETS

CROSS REFERENCE PARAGRAPH

This application is a National Stage Entry of International Application No. PCT/US2023/063840, filed Mar. 7, 2023, which claims the benefit of U.S. Provisional Application No. 63/269,010, entitled "ANALYZING AND ENHANCING PERFORMANCE OF OILFIELD ASSETS," filed Mar. 8, 2022, the disclosure of which is hereby incorporated herein by reference.

BACKGROUND

Unconventional assets are increasingly being used to meet the world's energy demand. The term unconventional is used for difficult to produce ("tight") formations for which horizontal wells are drilled. Fractures are then created in the formations for the oil or gas to flow. The wells in these tight formations may have low productivity, and the production may decline rapidly after initial production. It may thus be desirable to enhance the value of the asset over its lifecycle. Efficiency gains in drilling and completions have resulted in current operations being cost effective for more than 65% of the US oil production, in comparison to less than 10% in 2010.

SUMMARY

According to various embodiments, a method is presented. The method includes receiving oilfield data input; projecting production for a plurality of wells in a field based at least in part on the oilfield data input and using one or more of Decline Curve Analysis (DCA), a machine learning model, Rate Transient Analysis (RTA); aggregating the projected production for the plurality of wells; identifying one or more wells for additional completion operations; determining one or more completion operations to conduct for the one or more identified wells, wherein the determining uses a machine learning model to forecast results of the one or more completion operations; computing, for the one or more identified wells, generational analytics related to well behaviors and based at least in part on respective well ages; and displaying, for the one or more identified wells, analytics, recommendations, or projections using a display dashboard.

Various optional features of the above method embodiments include the following. The method may include conducting the one or more completion operations for the one or more identified wells. The one or more completion operations may include hydraulic fracturing. The determining may further include determining at least one of: total proppant mass, total fluid volume, proppant mass per foot of lateral length, or fluid in gals per foot of lateral length. The displaying may include displaying recommendations, and the recommendations may include the at least one of: total proppant mass, total fluid volume, proppant mass per foot of lateral length, or fluid in gals per foot of lateral length. The determining may include considering connectivity of two or more proximal wells of the identified wells. The plurality of wells may include at least one not yet drilled well. The displaying may include displaying projections, where the projections comprise a long-term cashflow for the at least one not yet drilled well.

According to various embodiments, a non-transitory, computer-readable medium storing instructions is presented.

The instructions, when executed by at least one processor of a computing system, cause the computing system to perform operations, the operations comprising: receiving oilfield data input; projecting production for a plurality of wells in a field based at least in part on the oilfield data input and using one or more of Decline Curve Analysis (DCA), a machine learning model, Rate Transient Analysis (RTA); aggregating the projected production for the plurality of wells; identifying one or more wells for additional completion operations; determining one or more completion operations to conduct for the one or more identified wells, wherein the determining includes considering connectivity of two or more proximal wells of the identified wells and uses a machine learning model to forecast results of the one or more completion operations; computing, for the one or more identified wells, generational analytics related to well behaviors and based at least in part on respective well ages; and displaying, for the one or more identified wells, analytics, recommendations, or projections using a display dashboard.

Various optional features of the above computer-readable medium embodiments include the following. The one or more completion operations may include hydraulic fracturing. The determining may further include determining at least one of: total proppant mass, total fluid volume, proppant mass per foot of lateral length, or fluid in gals per foot of lateral length. The displaying may include displaying recommendations, and the recommendations may include the at least one of: total proppant mass, total fluid volume, proppant mass per foot of lateral length, or fluid in gals per foot of lateral length. The determining may include considering connectivity of two or more proximal wells of the identified wells. The plurality of wells may include at least one not yet drilled well.

According to various embodiments, a computing system is presented. The computing system includes one or more processors; and a memory system comprising one or more non-transitory, computer-readable media storing instructions that, when executed by at least one of the one or more processors, cause the computing system to perform operations. The operations include: receiving oilfield data input; projecting production for a plurality of wells in a field based at least in part on the oilfield data input and using one or more of Decline Curve Analysis (DCA), a machine learning model, Rate Transient Analysis (RTA); aggregating the projected production for the plurality of wells; identifying one or more wells for additional completion operations; determining one or more completion operations to conduct for the one or more identified wells, wherein the determining includes considering connectivity of two or more proximal wells of the identified wells and uses a machine learning model to forecast results of the one or more completion operations; computing, for the one or more identified wells, generational analytics related to well behaviors and based at least in part on respective well ages; and displaying, for the one or more identified wells, analytics, recommendations, or projections using a display dashboard.

Various optional features of the above computing system embodiments include the following. The one or more completion operations may include hydraulic fracturing. The determining may further include determining at least one of: total proppant mass, total fluid volume, proppant mass per foot of lateral length, or fluid in gals per foot of lateral length. The displaying may include displaying recommendations, and the recommendations may include the at least one of: total proppant mass, total fluid volume, proppant mass per foot of lateral length, or fluid in gals per foot of lateral length. The determining may include considering connectivity of two or more proximal wells of the identified wells. The plurality of wells may include at least one not yet drilled well.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 5 illustrates a flowchart of a method for analyzing and enhancing oilfield assets, according to an embodiment.

FIG. 16 illustrates a flowchart of a workflow for generation analytics calculation, according to an embodiment.

DESCRIPTION OF EMBODIMENTS

Figure 2:
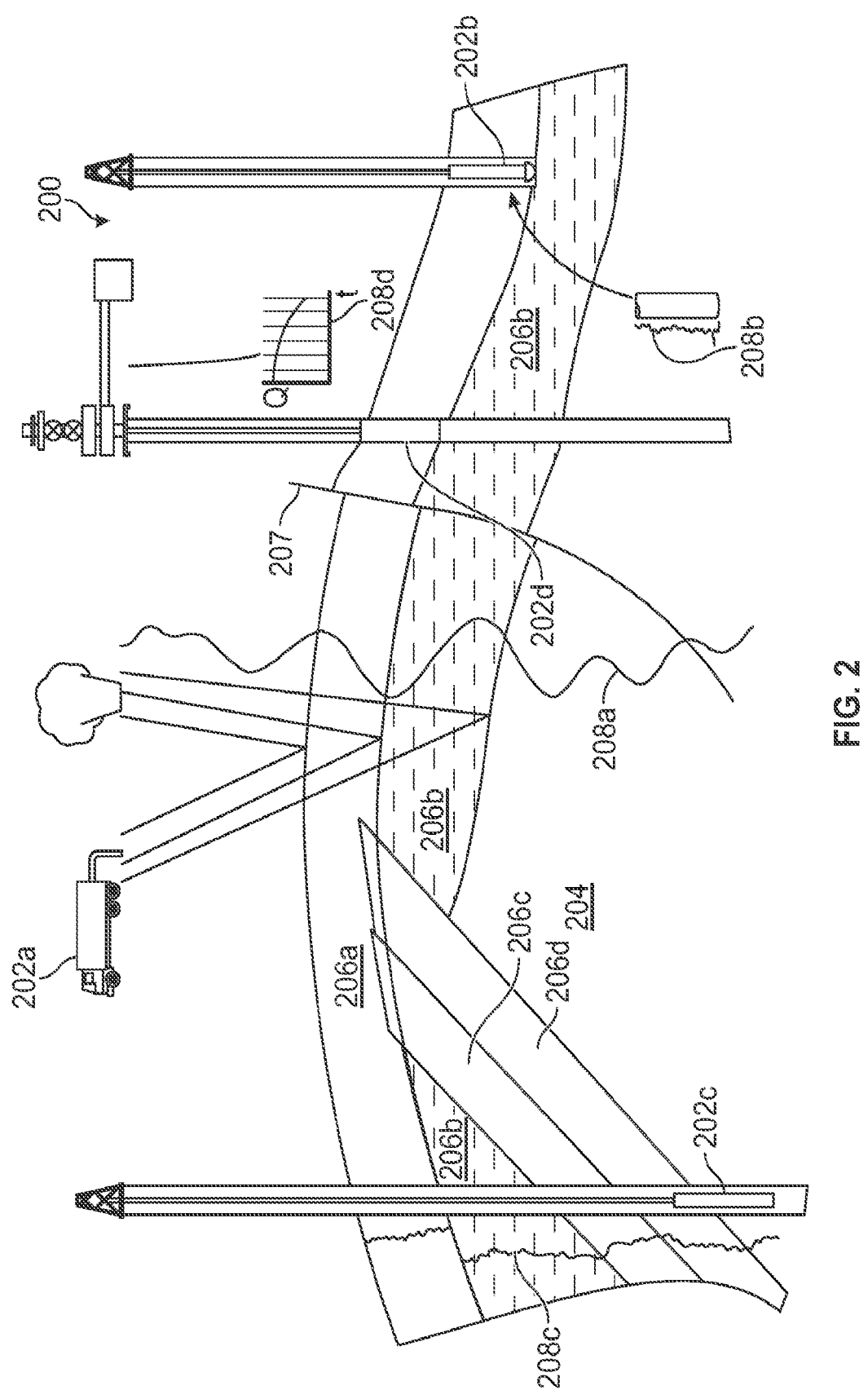

Reference will now be made in detail to embodiments, examples of which are illustrated in the accompanying drawings and figures. In the following detailed description, numerous specific details are set forth in order to provide a thorough understanding of embodiments of the invention. However, it will be apparent to one of ordinary skill in the art that embodiments of the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the embodiments of the invention. The first object and the second object are both objects, respectively, but they are not to be considered the same object.

The terminology used in the description of the invention herein is for the purpose of describing particular embodiments only and is not intended to be limiting of embodiments of the invention. As used in the description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116a. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors(S), such as gauges, may be positioned about oilfield 100 to collect data relating to various oilfield operations as described previously. As shown, sensor(S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors(S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors(S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time or stored for later use. The data may also be combined with historical data or other inputs for further analysis. The data may be stored in separate databases or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106c of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors(S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors(S), such as gauges, may be positioned about oilfield 100 to collect data relating to various field operations as described previously. As shown, the sensor(S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors(S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202*a*, 202*b*, 202*c* and 202*d* positioned at various locations along oilfield 200 for collecting data of subterranean formation 204 in accordance with implementations of various technologies and techniques described herein. Data acquisition tools 202*a*-202*d* may be the same as data acquisition tools 106*a*-106*d* of FIGS. 1A-1D, respectively, or others not depicted. As shown, data acquisition tools 202*a*-202*d* generate data plots or measurements 208*a*-208*d*, respectively. These data plots are depicted along oilfield 200 to demonstrate the data generated by the various operations.

Data plots 208*a*-208*c* are examples of static data plots that may be generated by data acquisition tools 202*a*-202*c*, respectively; however, it should be understood that data plots 208*a*-208*c* may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208*a* is a seismic two-way response over a period of time. Static plot 208*b* is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208*c* is a logging trace that typically provides a resistivity or other measurement of the formation at various depths.

A production decline curve or graph 208*d* is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206*a*-206*d*. As shown, this structure has several formations or layers, including a shale layer 206*a*, a carbonate layer 206*b*, a shale layer 206*c* and a sand layer 206*d*. A fault 207 extends through the shale layer 206*a* and the carbonate layer 206*b*. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208*a* from data acquisition tool 202*a* is used by a geophysicist to determine characteristics of the subterranean formations and features. The core data shown in static plot 208*b* and/or log data from well log 208*c* are typically used by a geologist to determine various characteristics of the subterranean formation. The production data from graph 208*d* is typically used by the reservoir engineer to determine fluid flow reservoir characteristics. The data analyzed by the geologist, geophysicist and the reservoir engineer may be analyzed using modeling techniques.

Figure 3A:
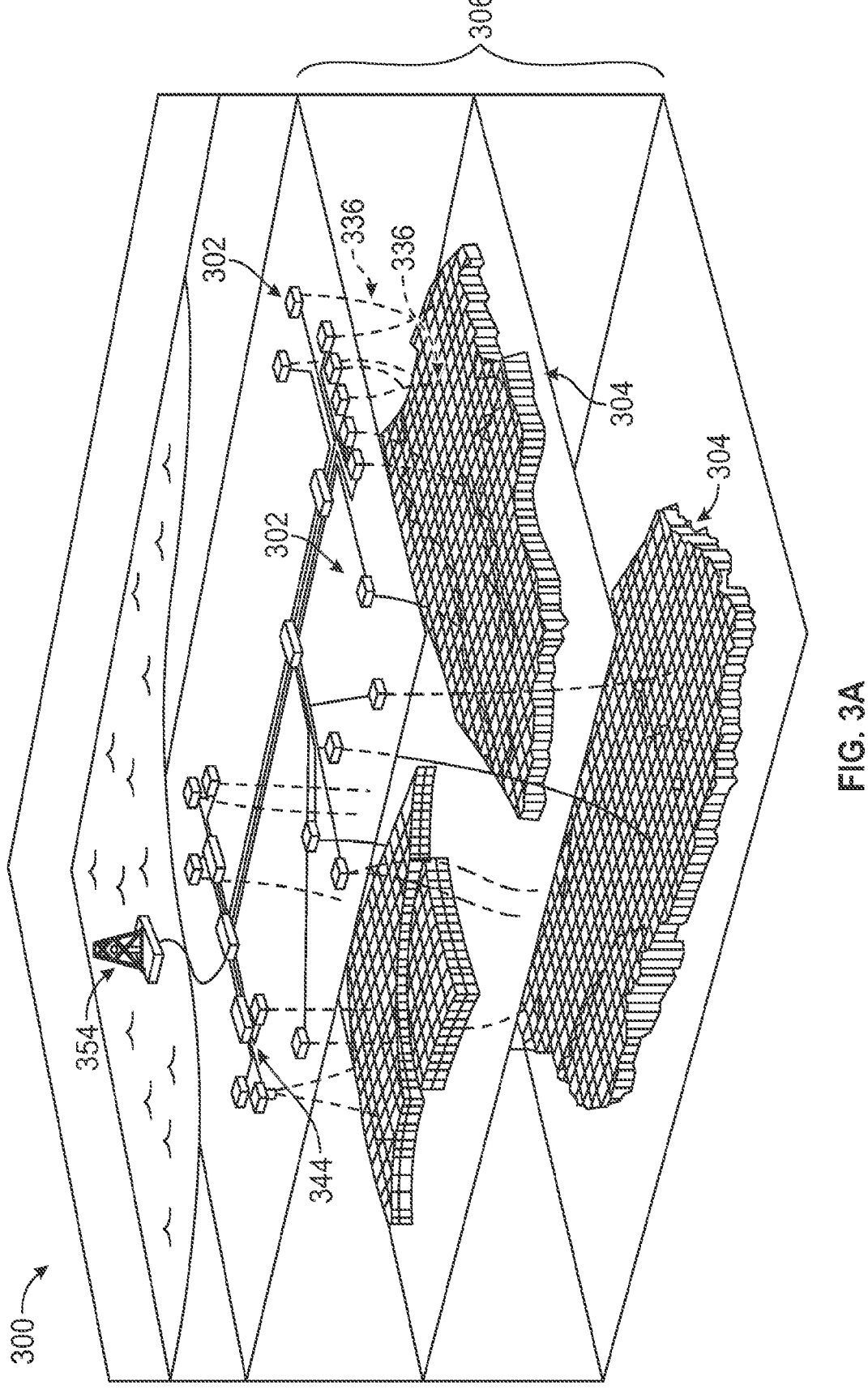

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
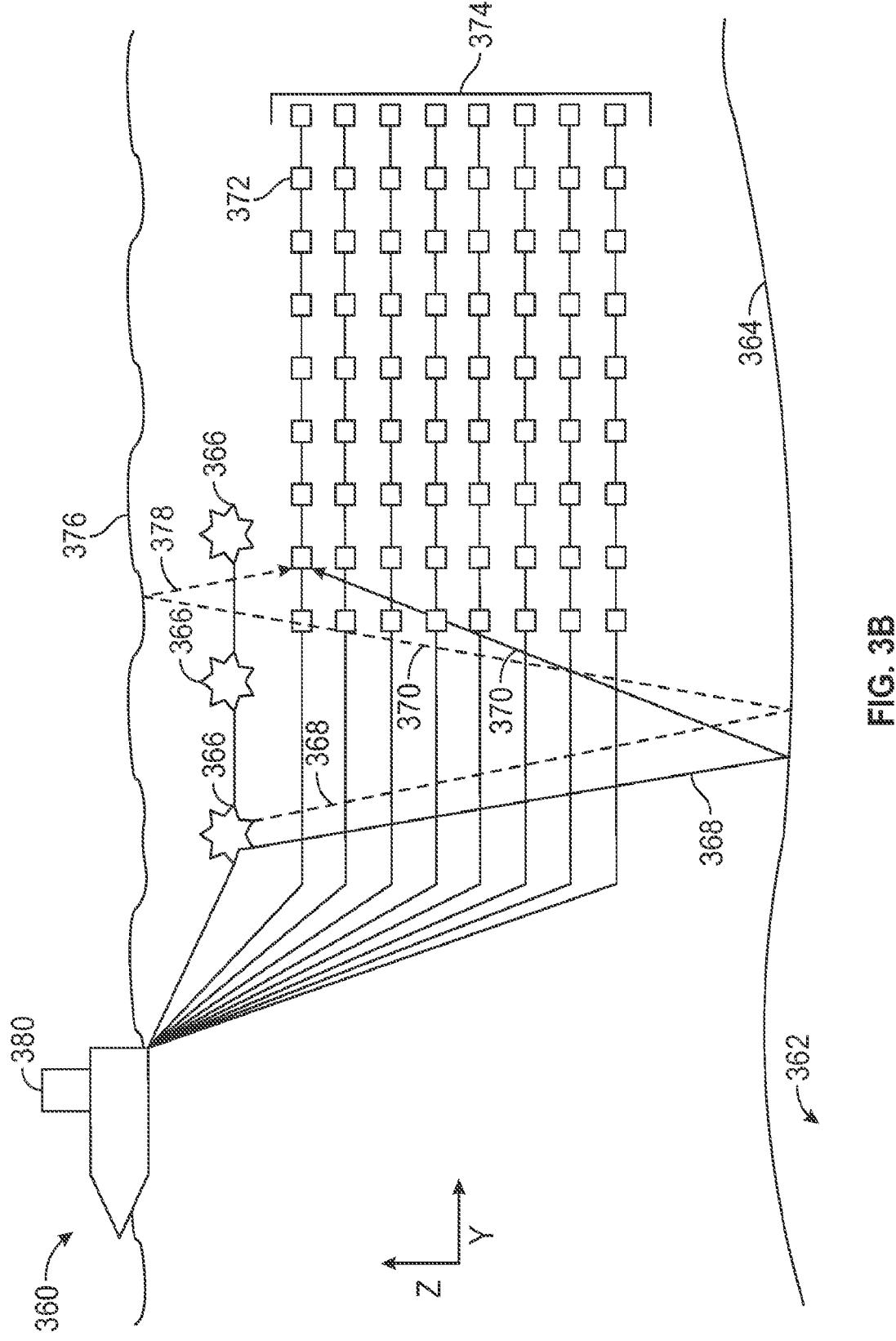

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Embodiments of the present disclosure include an integrated method that combines analysis techniques with data science and machine learning concepts to provide a holistic solution. At least some embodiments may be executed using a digital transformation system encompassing big data and cloud computing, e.g., using the DELFI platform, commercially available from Schlumberger Ltd.

Reservoir Analytics may be a native cloud-based solution that facilitates rapid project life cycle aspects and helps in understanding well productivity, reserves, production decline and workover opportunities in unconventional assets. It provides asset teams with data-centric workflows encompassing both existing practices and new knowledge in an integrated solution leveraging both public and proprietary operator owned data.

Various aspects of the present disclosure may include a system of evaluation of well performance of unconventional wells, which may be configured to identify operational insights for improvement. Further, a system of connecting engineering workflows, simulation engines and machine learning (ML) services with static and dynamic data in an open subsurface data universe (OSDU) platform in a continuous loop. Further, ML-driven techniques for rate transient flow regime recognition and forecasting for wells with short production history may be provided. Embodiments may also include a system of asset forecasting and well ranking for asset performance analysis and refinement. A system of data driven completion refinement techniques to exploit hydrocarbons in unconventional assets may also be provided. Further, generational analytics for well interference insights may be provided. A system of data storage, organization, and access in OSDU may be included, which may, for example, enhance scalability to handle millions of records. Digital dashboards for decision making from individual well to asset at individual stages of the life of the asset may also be included. Further, self-learning ability for ML models with new well information may be implemented.

Embodiments of the disclosure may connect digital technologies and domain workflows to create a cloud-native solution addressing the challenges around unconventional assets. Embodiments may merge domain science with data-driven digital solutions at various levels of scale.

Figure 4:
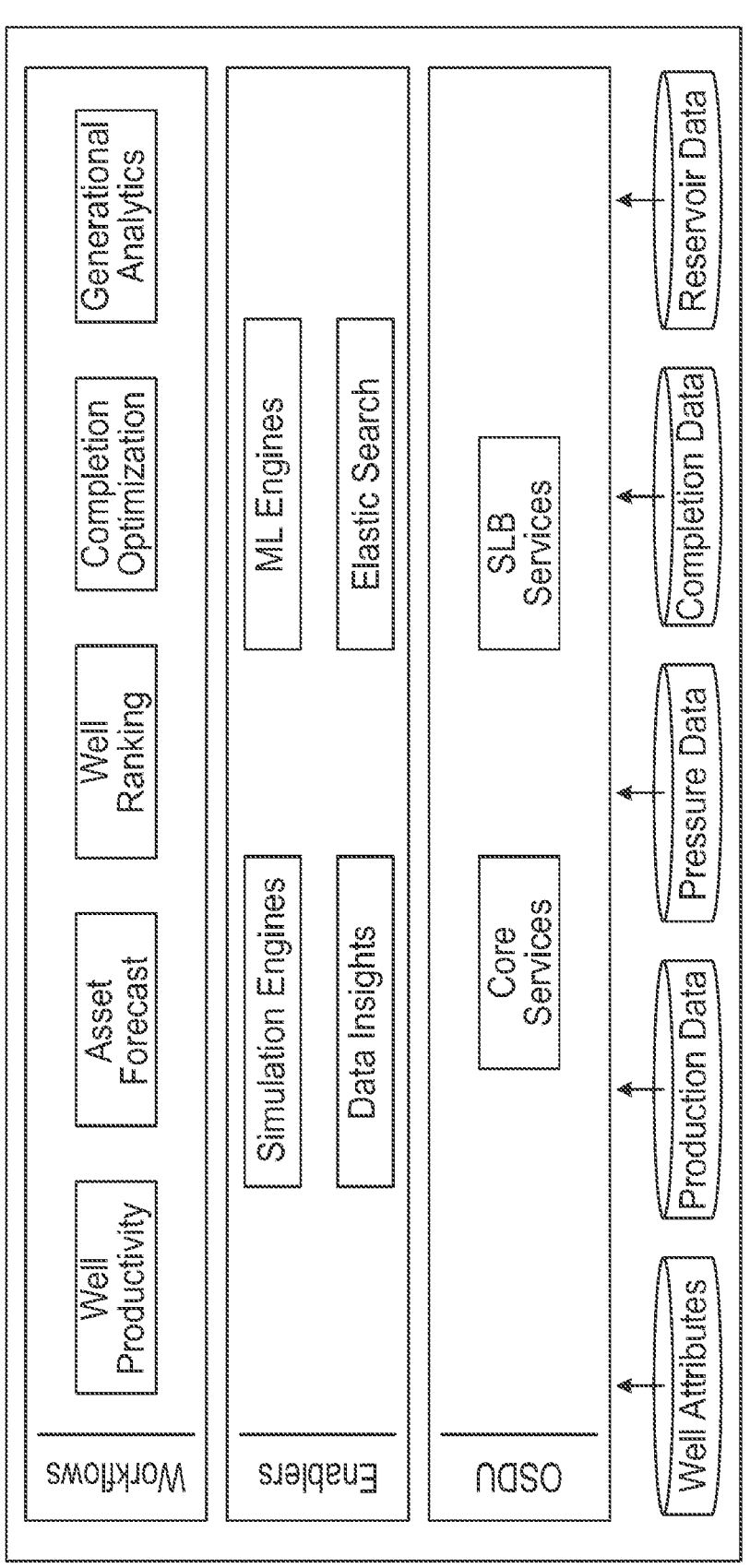
FIG. 4 illustrates a schematic view of a system for analyzing and enhancing oilfield assets, according to an embodiment.
Figure 6A:
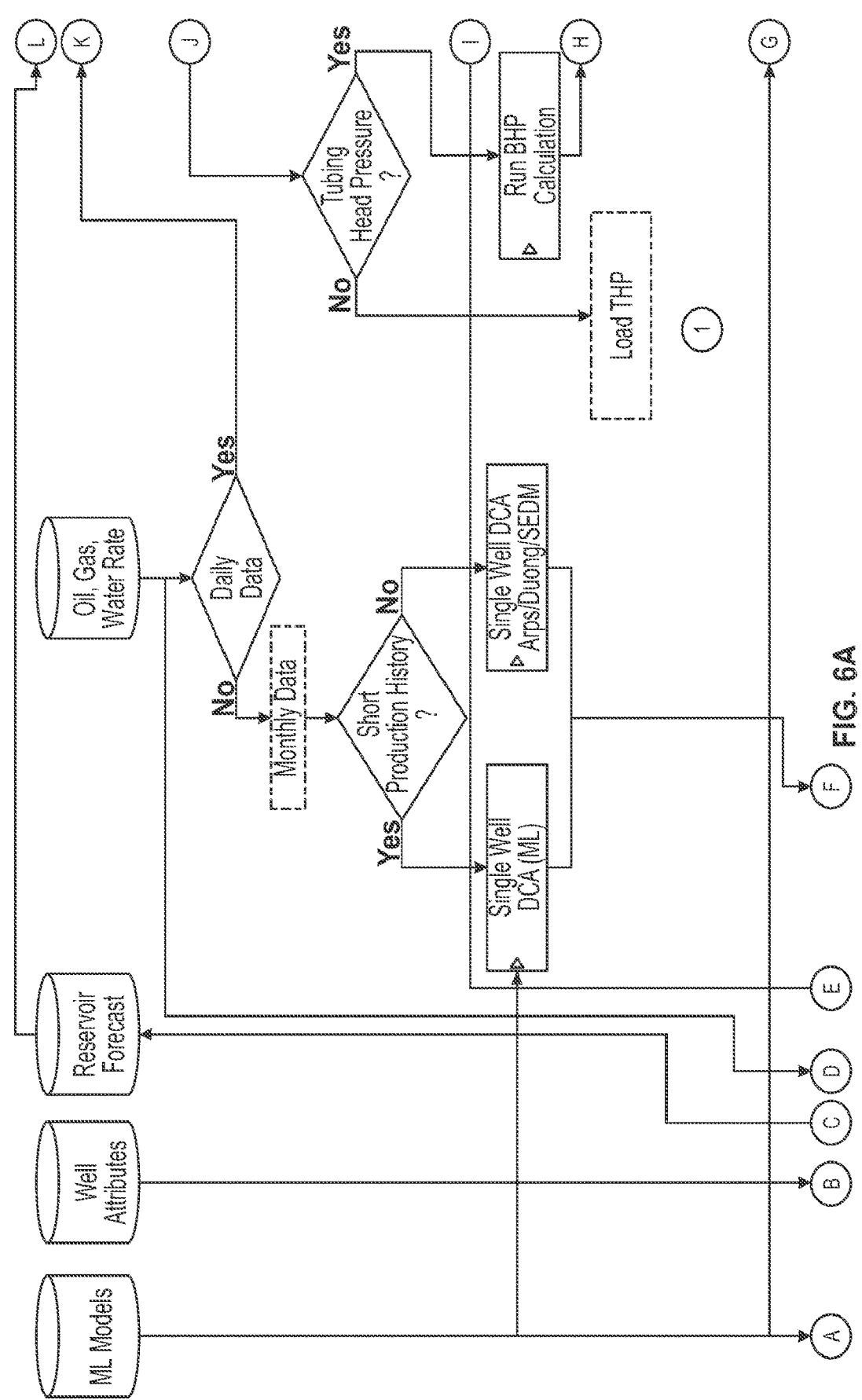
FIG. 6 illustrates a flowchart of a workflow for analyzing and enhancing oilfield assets, according to an embodiment.
Figure 6B:
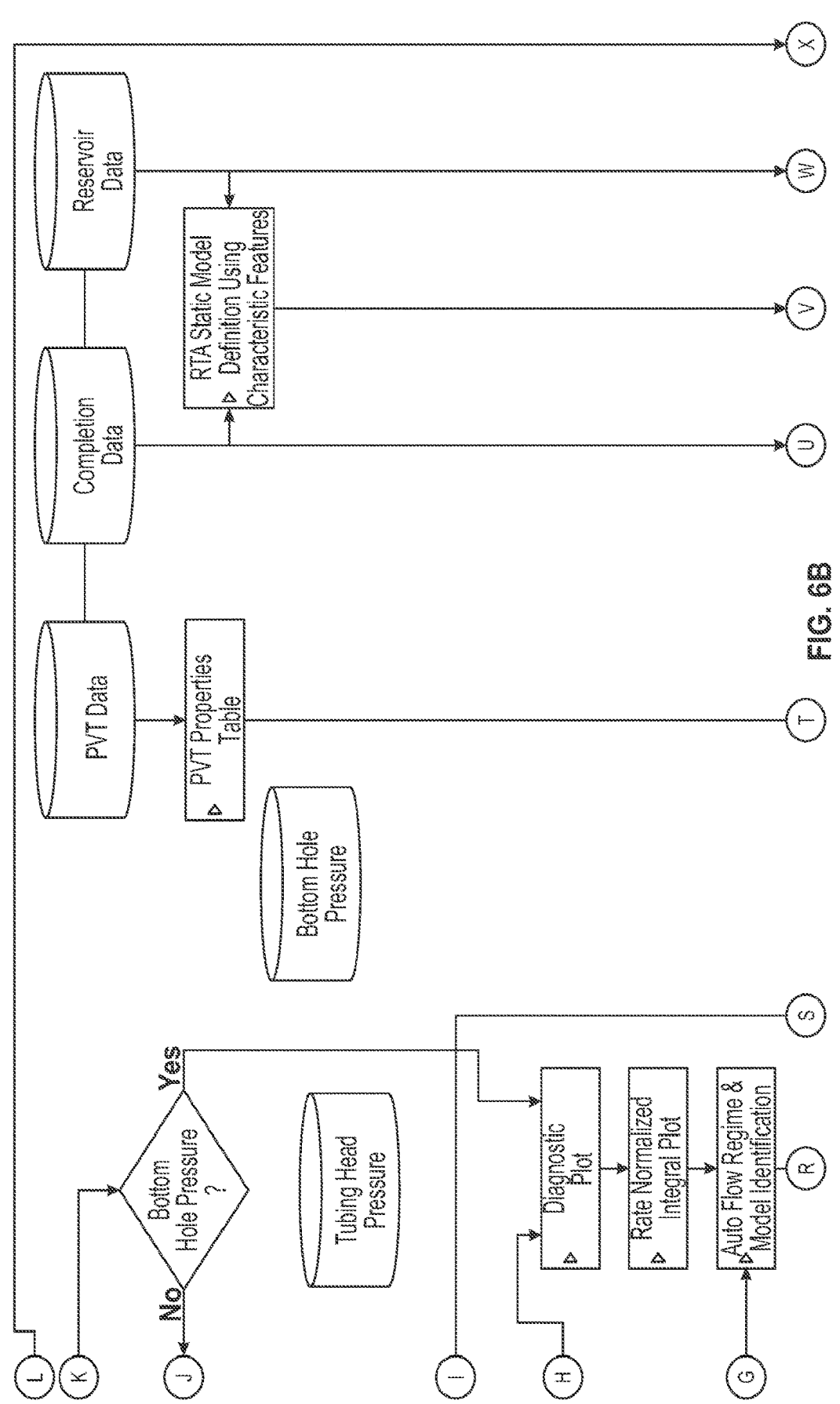
Figure 6C:
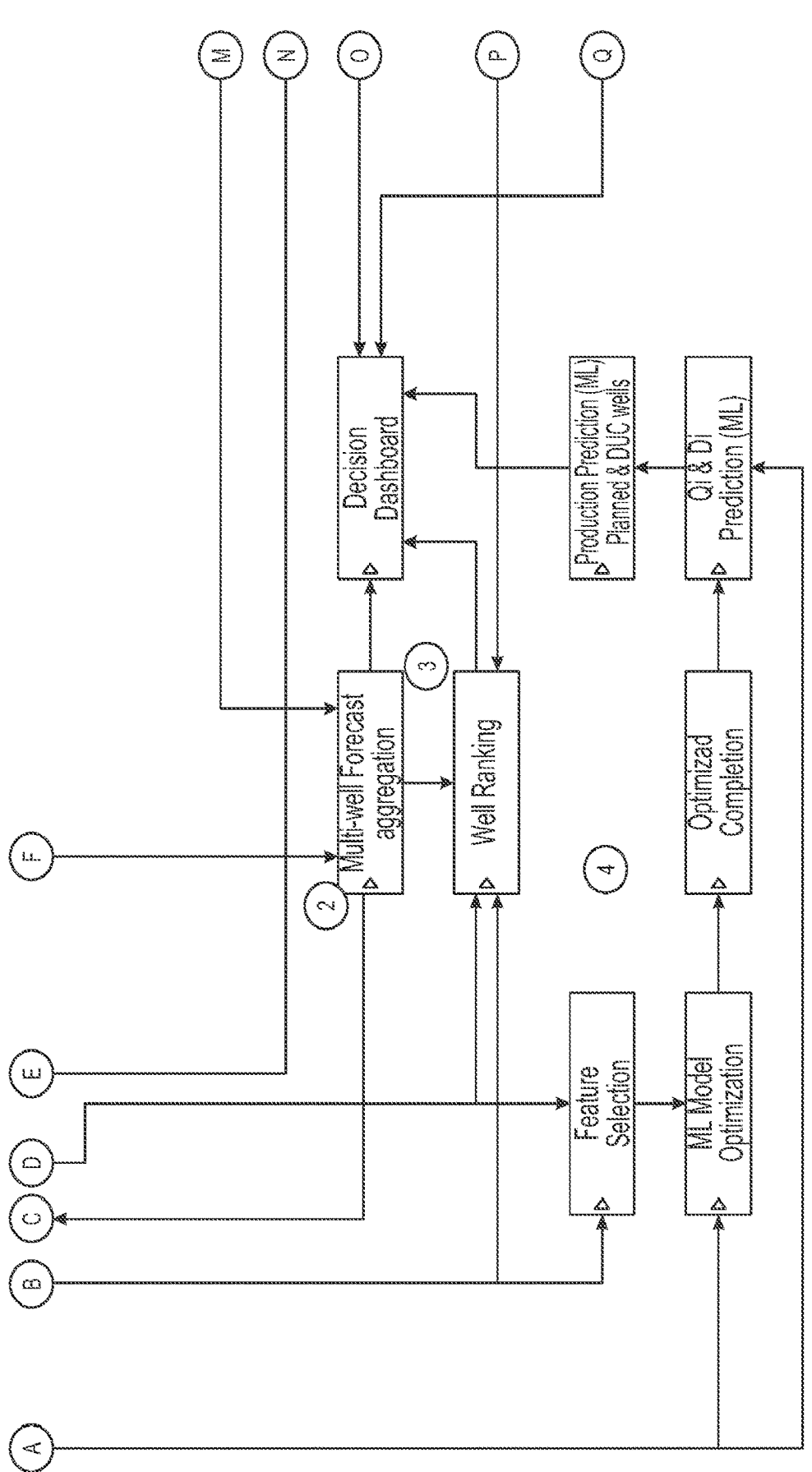
Figure 6D:
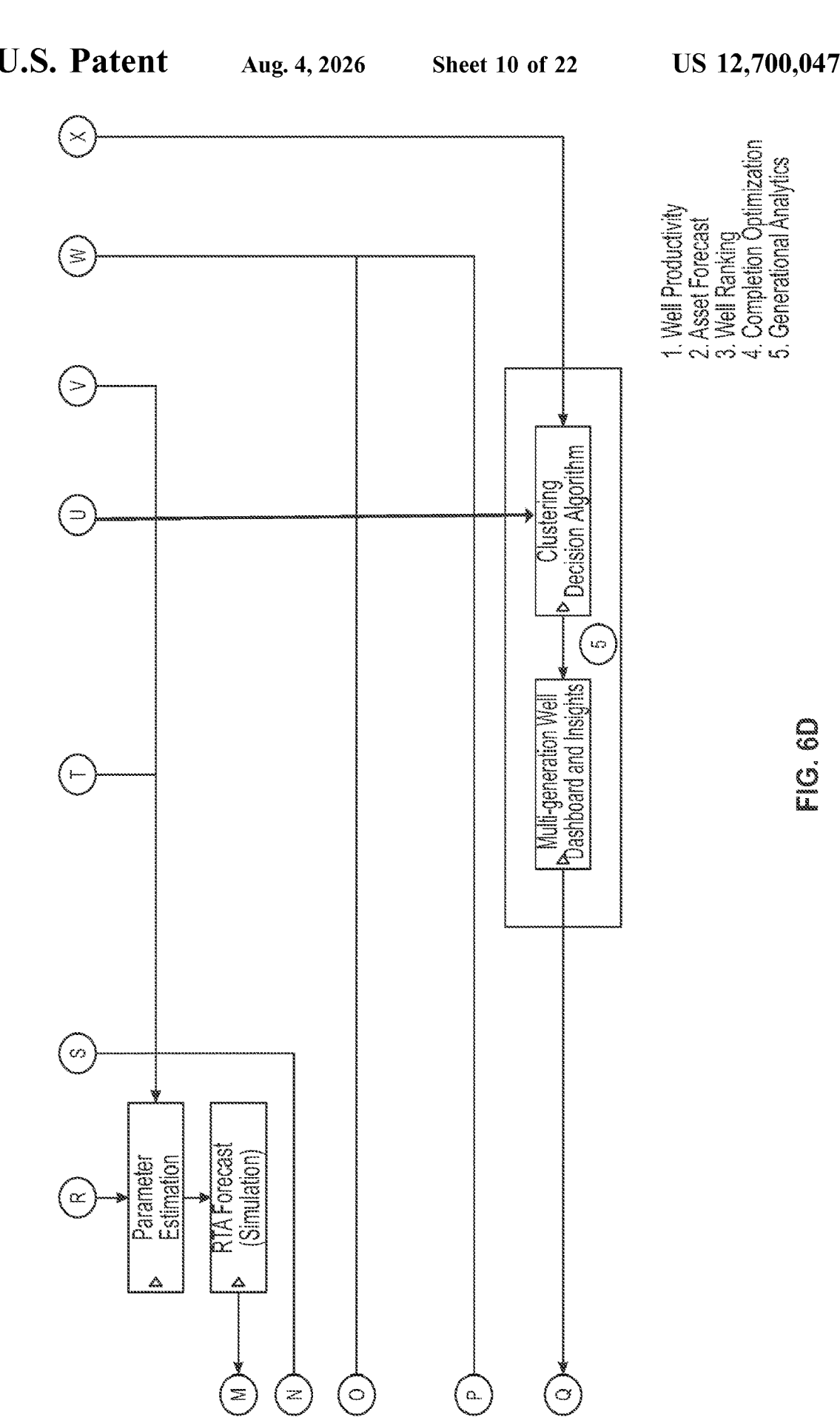
Figure 8:
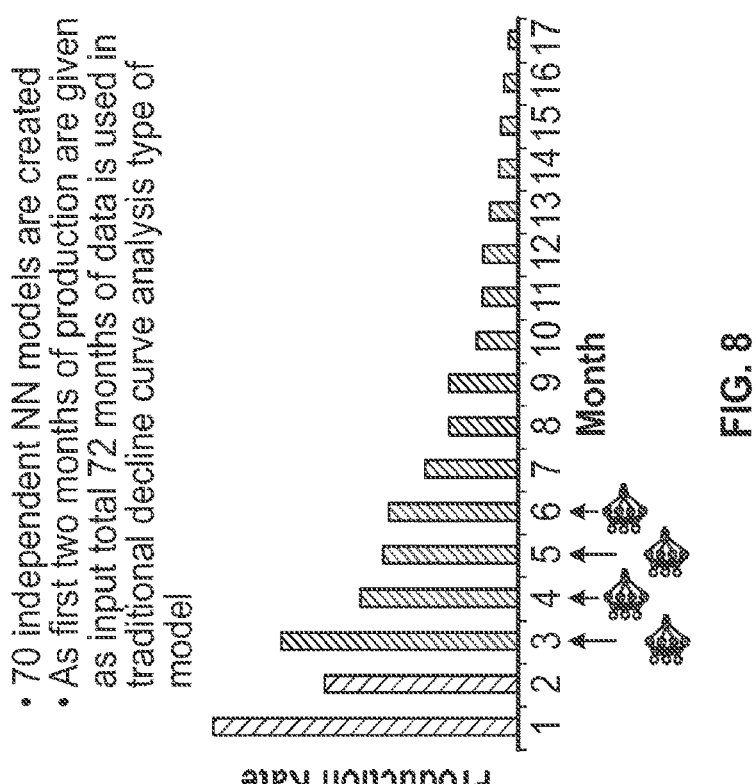
FIG. 8 illustrates an output of a neural network applied to several wells, according to an embodiment.
Figure 7:
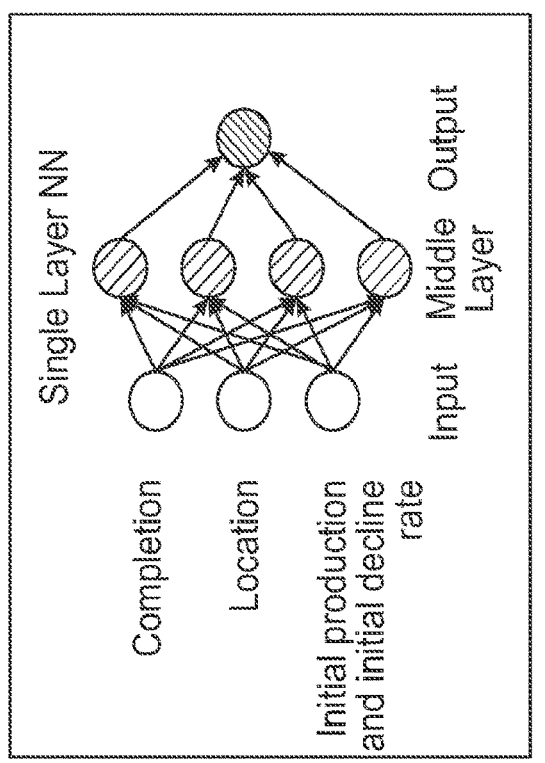
FIG. 7 illustrates a conceptual view of a neural network for predicting well production performance, according to an embodiment.
Figure 9:
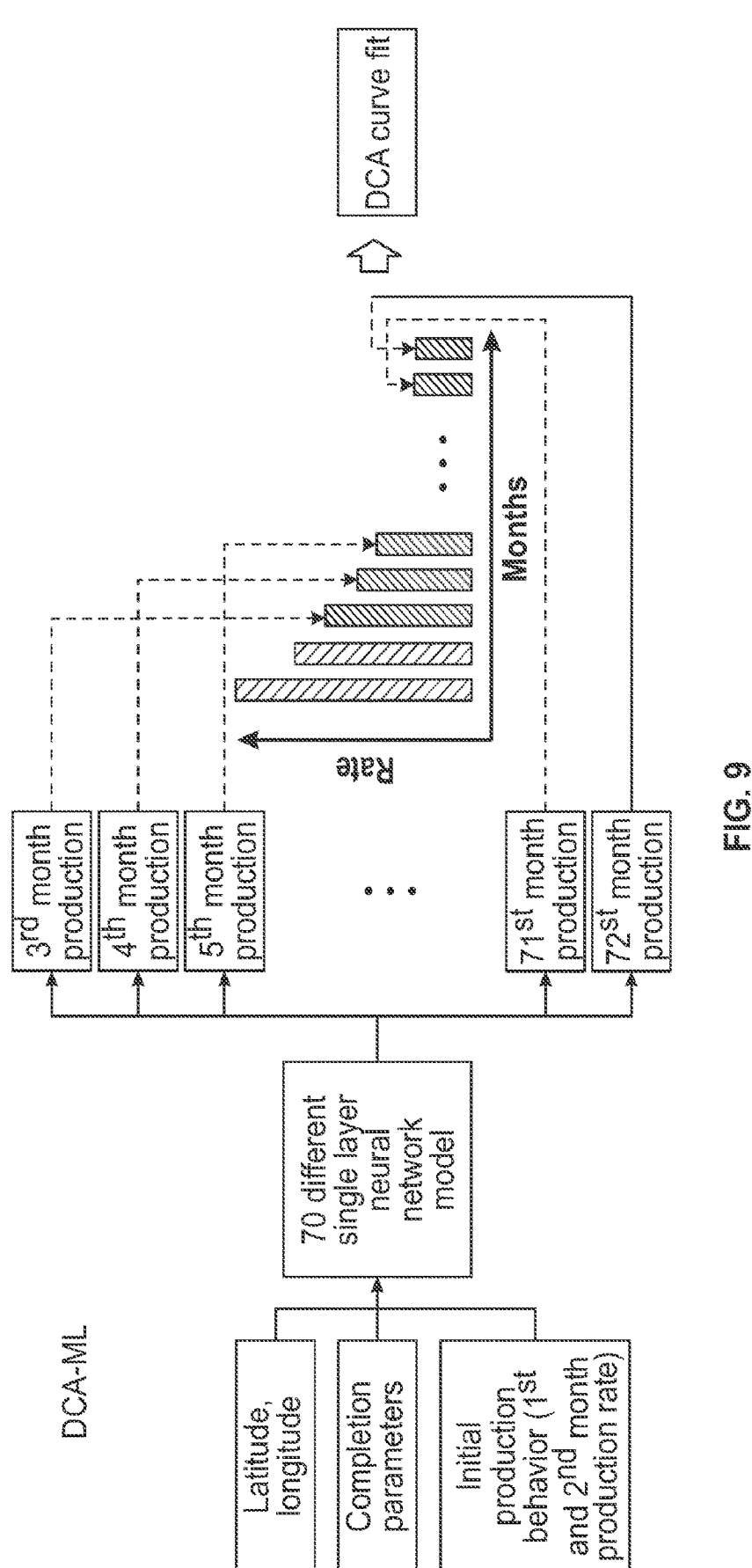
FIG. 9 illustrates a workflow of a process for predicting well production performance using a neural network (or another machine learning model), according to an embodiment.
Figure 10:
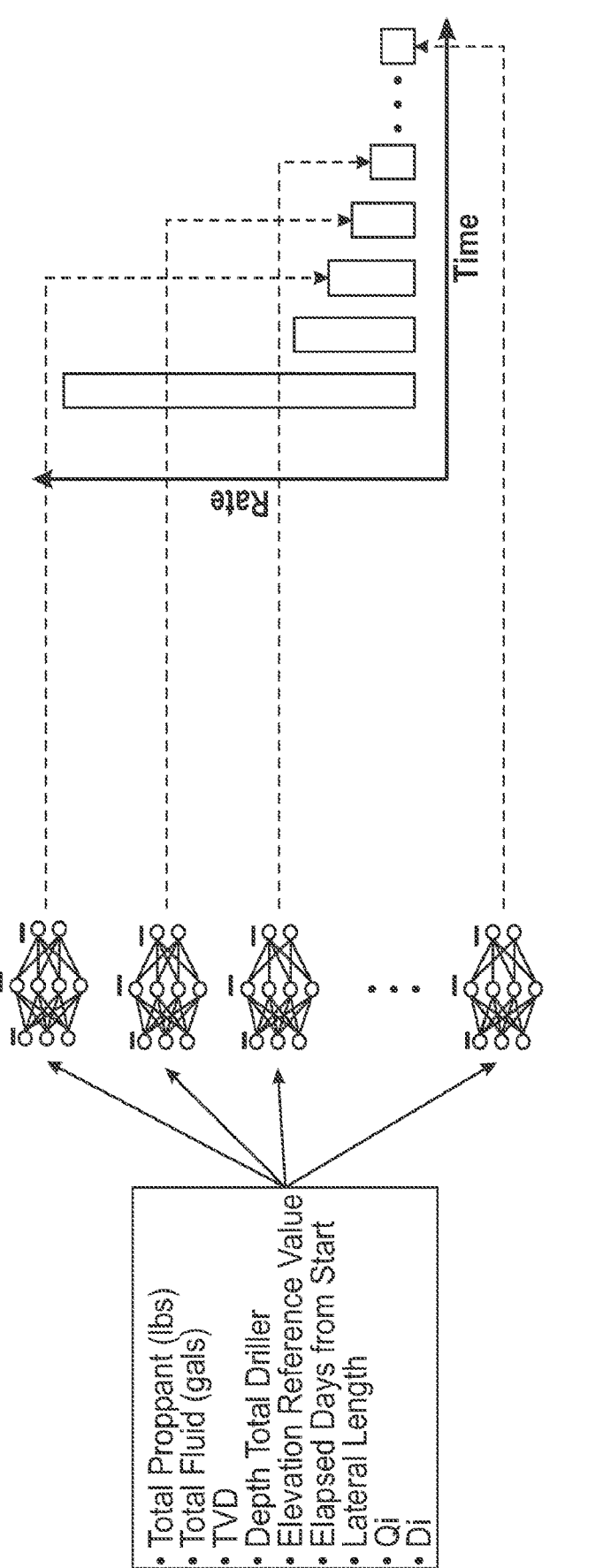
FIG. 10 illustrates another workflow of a process for predicting well production performance using a neural network (or another machine learning model), according to an embodiment.

Embodiments of the present disclosure may include three parts, which may be integrated together to perform reservoir analytics, as shown in FIG. 4. As shown in FIG. 4, the conceptual base for the system may be an OSDU layer, which may receive input from well attributes, production data, pressure data, completion data, and/or reservoir data collected from any available sources. The OSDU platform provides a scalable, vendor-independent platform for storing, organizing, and accessing static and dynamic data.

The next layer up is for "enablers", e.g., the "brain" behind the computational engines. With built-in ML solutions and proven physics-based numerical solvers, organizations can make more informed decisions and predictions. With cloud computing on the OSDU platform, a user can integrate wide variety of data types, access them instantly with elastic search and extract insights to improve the accuracy and speed of these predictions enabling efficiency gains.

The top-most layer in the illustrated embodiment provides workflows for operations management and decision making for the unconventional asset team. The enablers with the workflows work in tandem and help reduce turnaround time in effective decision making.

FIG. 5 illustrates a simplified flowchart of a method 500 for analyzing and enhancing well performance, e.g., for unconventional assets, according to an embodiment. The method 500 includes receiving oilfield data input, as at 502. This input may include any one or more of the input classes discussed above and shown in FIG. 4, and/or others. The method 500 includes projecting production for wells in the field, as at 504. The wells that are projected may include drilled and completed wells (i.e., those already producing or capable of producing), drilled but uncompleted (DUC) wells, planned but not yet drilled wells, or unplanned wells. Various techniques for projecting production for individual wells in an interconnected field of wells may be employed, as will be discussed in greater detail below. Further, rate transient analysis may be conducted in this workstep.

The production projections may then be aggregated and ranked, as at 506. This may provide insight into wells that are worthwhile, those that are marginal, and those that are not worth proceeding. Further, wells that can be completed, worked-over, etc., in order to enhance production may be identified from such aggregation/ranking.

The method 500 includes determining completion operations to conduct for individual wells in the field, as at 508. Such determinations, for some examples, are conducted using machine-learning-based workflows, as will be discussed in greater detail below. Performing the determinations takes into account connectivity of two or more proximal wells of the identified wells according to some examples, e.g., in a parent-child relationship. Such accounting, for some examples, utilizes a closest well spacing algorithm or analysis at the spatial clustering level. The machine learning workflows, for some examples, use a machine learning model to forecast results of the one or more completion operations. The determinations, for some examples, includes determining whether to conduct one or more hydraulic fracturing operations as completion operations. The determinations, for some examples, include determining one or more hydraulic fracturing parameters, such as any, or a combination, of: total proppant mass, total fluid volume, proppant mass per foot of lateral length, and/or fluid in gals per foot of lateral length.

Further, if/when these completion operations are conducted (or alternatively one or more completion operations may be simulated and used as hypothetical use-case models), the projections at 504 may be impacted and adjusted, e.g., as noted by the return loop in FIG. 5.

The method 500 also includes computing generational analytics related to behavior of multiple wells in a reservoir, as at 510. The generational analytics, for some examples, relate to the times that the individual wells are completed. Multiple wells completed within a period of several weeks or several months, for some examples, constitute a single generation, e.g., if the wells are completed using similar or identical completion operations.

The method 500 includes generating outputs of the various stages of the method 500 for display in a display dashboard, as at 512. This dashboard enables rapid, accurate, and efficient decision-making for one or more of drilling, completion, and production operations, in particular, determining what completion activities to do and where, to name one example.

FIG. 6 illustrates a more detailed flowchart of a system workflow that implements the method 500 discussed above, according to an embodiment. As noted, the workflow generally has five stages: well productivity projection/forecasting, asset forecasting, well ranking, completion "optimization", and generational analytics. It will be appreciated that "optimizing" does not necessarily mean the single best choice is arrived at and selected, as most choices require engineering tradeoffs. Rather, optimizing should be construed to be synonymous to "refining", meaning that the process seeks to improve a parameter selection, for example.

E&P operators today have access to a plethora of well data. The common challenge is to access, navigate and extract meaningful insights in a timely manner. The first aspect is creating a scalable database that can store millions of data records for multitudes of data types acquired in an unconventional operation. Static and dynamic subsurface data like well attributes, production rates, pressure, completion parameters, reservoir attributes, PVT etc. has been captured with specific schemas. Elastic search, aggregation and data tagging services have been implemented to quickly identify and access this information.

Next, the well performance may be evaluated. Depending on the frequency of available production data and the period of production history, the user may choose the appropriate techniques for well performance evaluation. In absence of pressure data traditional decline curve analysis (DCA) methods may be used. However, if the wells have short production history where the traditional methods fail, an ensemble of deep neural networks has been developed to predict the production decline characteristics, as shown in FIGS. 7, 8, 9, and 10.

Figure 11:
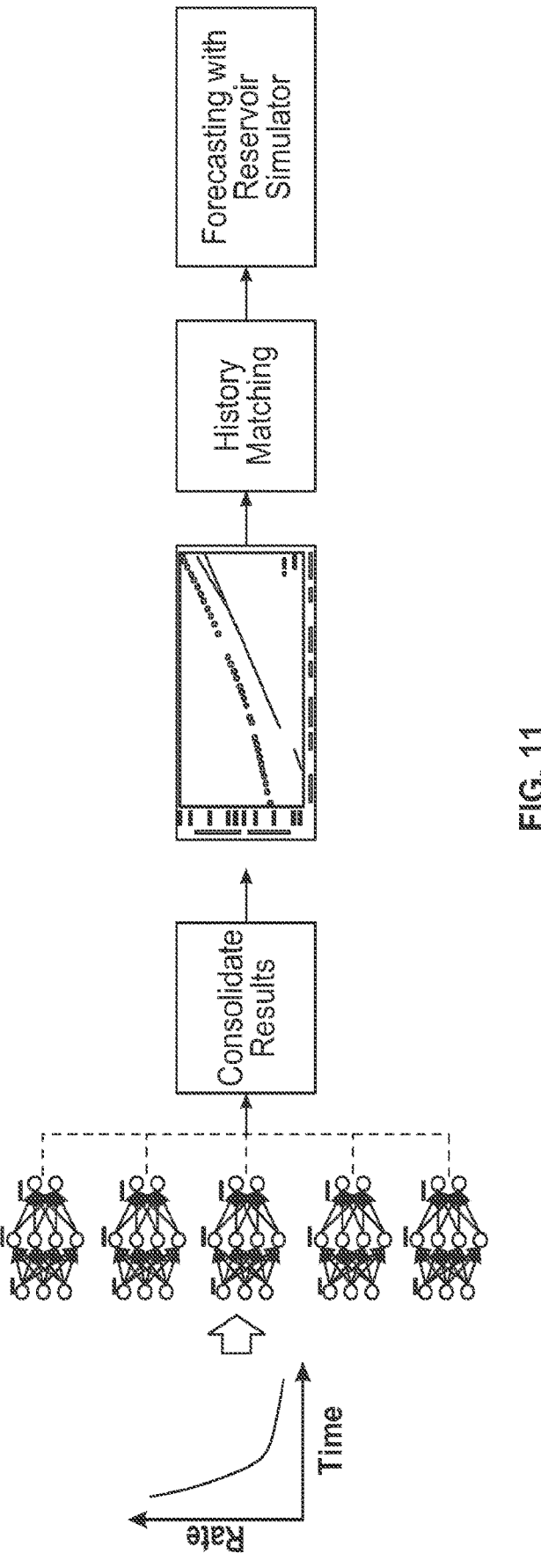
FIG. 11 illustrates a workflow of a process for performing rate transient analysis as part of the overall workflow, according to an embodiment.

Key wells in the asset where additional data like PVT, reservoir attributes and daily production data are available enable application of a more robust rate transient analysis (RTA). The RTA method has been embedded with ML engine to identify flow regimes in hydraulically fractured unconventional reservoirs during oil and gas production. The developed system uses an ensemble of deep neural network models to classify time periods during oil and gas production and categorizes them into different flow regimes. The system uses these identified flow regimes to calculate the estimated fractures lengths and conductivity. The calculated values are further refined using a refinement system coupled with an analytical reservoir simulator. Finally, the reservoir simulation is used to forecast the future production behavior of the well. The detailed workflow is shown in FIG. 11.

Production forecasting may be implemented using a machine learning model to forecast the production rate of hydrocarbons from oil and gas wells. The model is developed to predict the first (e.g., for 72 months) production rate for a well based on initial production behavior observed from the well, and completion and geological parameters.

The production forecasting is done using an ensemble of simple single layer neural networks. For example, single layer neural networks with 1500 elements may be used. For some embodiments, the models use inputs such as total proppant mass, total fluid volume, true vertical depth of the well, total depth of the well, elevation, lateral length, latitude, longitude, first month production, and initial decline rate of production. These inputs are not limited to those described herein, and the technique can be extended to account for more inputs, such as those related to geological and completion parameters. The developed technique is unique as it creates, unlike other time series forecasting techniques, an individual model for each month of production and arranging them to construct the entire time series. In addition, it not only depends on the past behavior of the time series, but it also accounts for other attributes (e.g., geological and completion) which are not considered in conventional time series forecasting algorithms and can significantly impact the production behavior of the well. Hence, accounting these parameters in the model gives the method a significant advantage over other techniques. The ensemble of neural networks are trained on the data of other wells, that helps the system to learn from behavior of these wells and forecast the production behavior of the well in focus. The technique, for some embodiments, also uses the production data from other wells for each month separately, as for prediction of each month, a separate neural network is created. This enables the use of wells with even small production history to contribute to the overall learning of the model. The final production behavior obtained from the neural networks for the first 72 months is used in traditional decline curve analysis type model (e.g., Arps) to get the resultant production behavior of the well. Fitting the predicted time series from neural networks in traditional decline curve type model diminishes the effect of the outliers in the systems and improves prediction behavior.

In this particular embodiment, 80,000 wells are used. The number of wells can be increased for improving the prediction of the model. Each of the models are trained to get accuracy greater than 90 percent. For some embodiments 70 models are trained. Other embodiments may use any number of models. Models with lower accuracy can be removed from consideration. Note that even dropping a few models may not affect the overall accuracy and robustness of the overall workflow.

Figure 12:
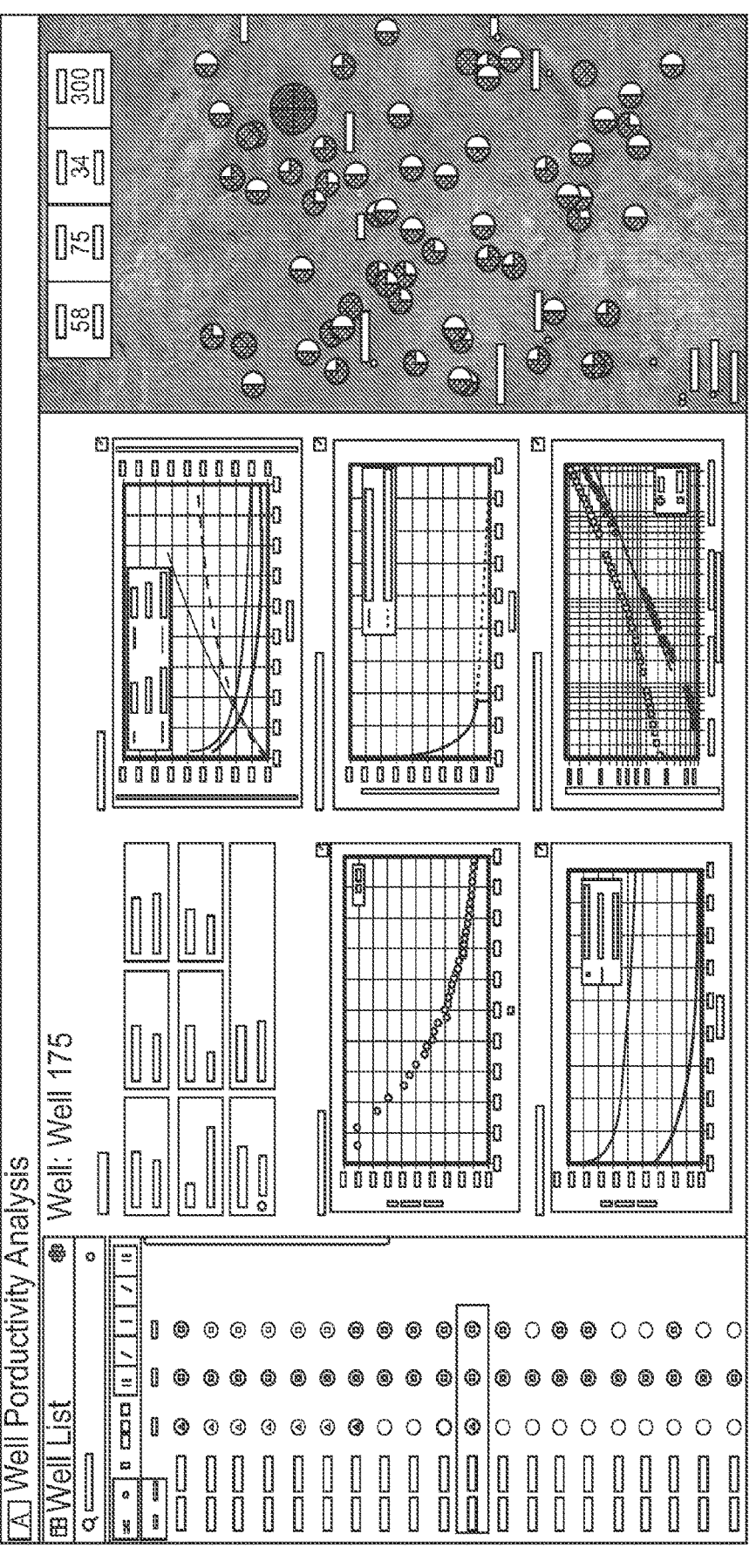
FIGS. 12 and 13 illustrate views of dashboards, according to an embodiment.

A well productivity dashboard is shown in FIG. 12, by way of example, and may provide a comprehensive framework for monitoring well performance. The active dashboard is updated as new well data and results are available allowing asset teams to make decisions to complete the well performance evaluations.

Next, a multi-well forecast aggregation and well ranking, as noted above, may be performed. The system may (e.g., automatically) aggregate based on user driven criterion of well grouping and provide answers about how long and how much the asset will keep producing hydrocarbon. The decision dashboard allows the asset teams to evaluate the effect of different completion parameters on producibility of the wells. The intuitive dashboard allows multiple attributes to be analyzed interactively in identifying the trends in asset performance.

Figure 13:
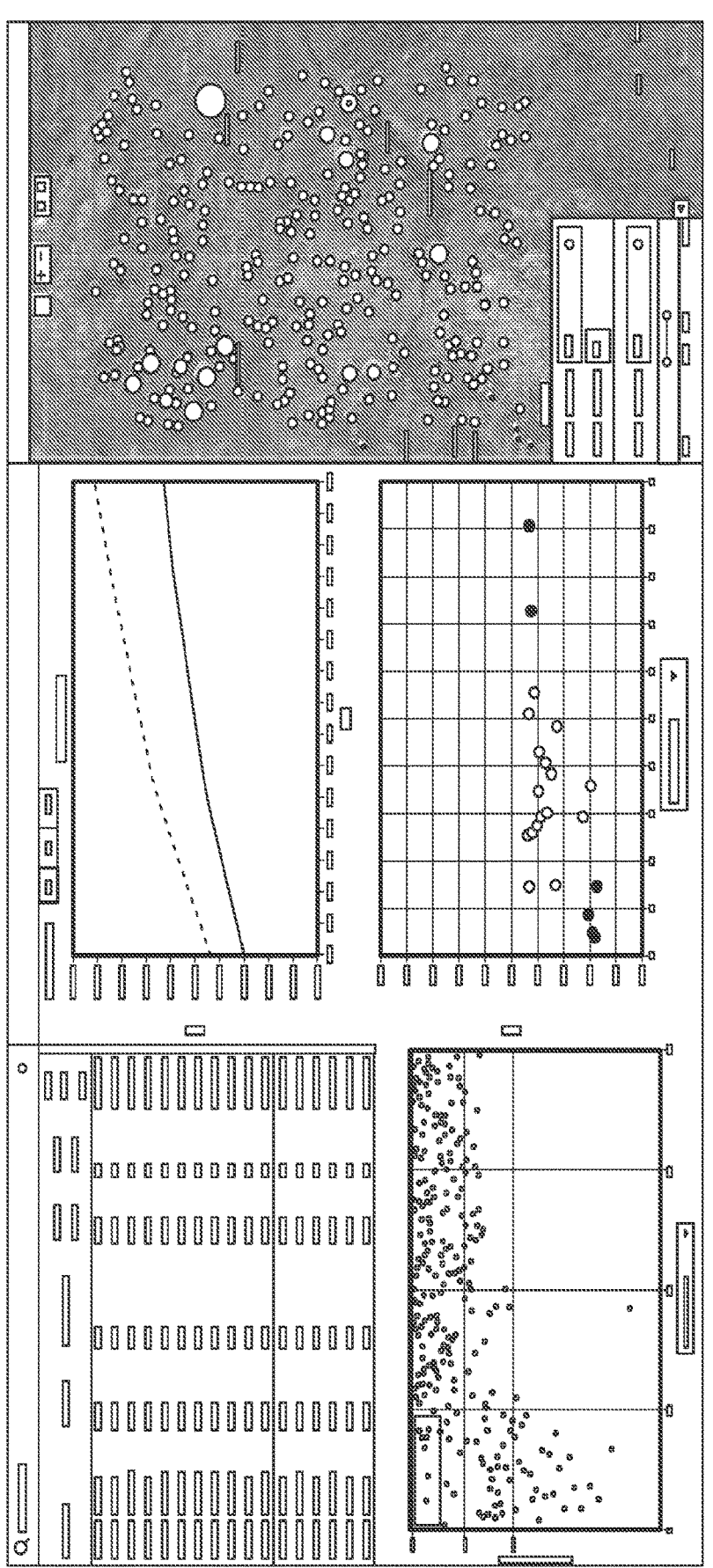

Production parameters and the completion index trends may be used to rank the existing wells in the asset and identify potential areas further to exploit. Wells in drilling inventory can be compared with the ranked wells to further prioritize based on their possible potential. The intuitive decision dashboards allow asset teams to quickly come up with informed operational decisions. An example of asset forecast and well ranking decision dashboard is shown in FIG. 13.

Examples of decision outcomes include: impact of drilling factors like lateral length on well performance; impact of completion aspects like total proppant and total fluid pumped on well performance; identification of specific reservoir quality having the biggest impact on EUR (estimated ultimate recovery), identification of refrac well candidates, targeting of underperforming wells for remedial actions, and prioritizing wells in drilling inventory.

The operational insights for completion decisions are obtained through the completion refinement workflow (box 4 in FIG. 6). Planned wells as well as drilled but uncompleted wells may be completed to start production. Embodiments of the present disclosure may take a data driven approach leveraging the abundance of production and completion data available for unconventional wells. A hybrid model including an ensemble learning based regression algorithm coupled with multiple (e.g., 72) deep neural networks is developed to predict the temporal behavior of production decline in oil and gas wells. The hybrid model is then used in either gradient based refinement technique or biology inspired natural selection-based refinement technique to get local or global solutions of completion design. The refinement process allows asset team members to achieve objectives such as maximization of three-month production. The produced decline behavior for 72 months may be used in other methods (example Arps) to capture forecast of the natural decline of the wells in the future (for example up to 20 years).

Figure 14A:
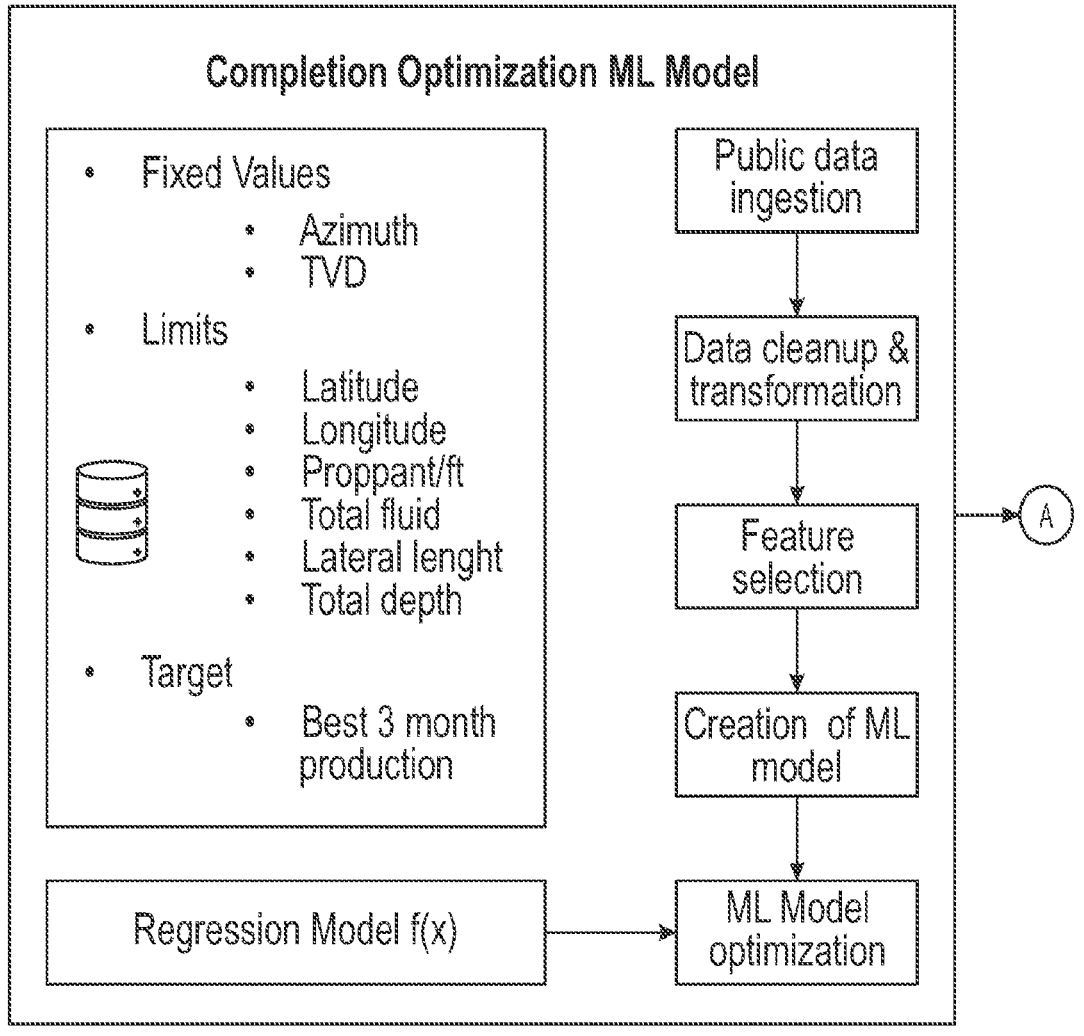
FIG. 14 illustrates a flowchart of a workflow for well completion refinement, according to an embodiment.
Figure 14B:
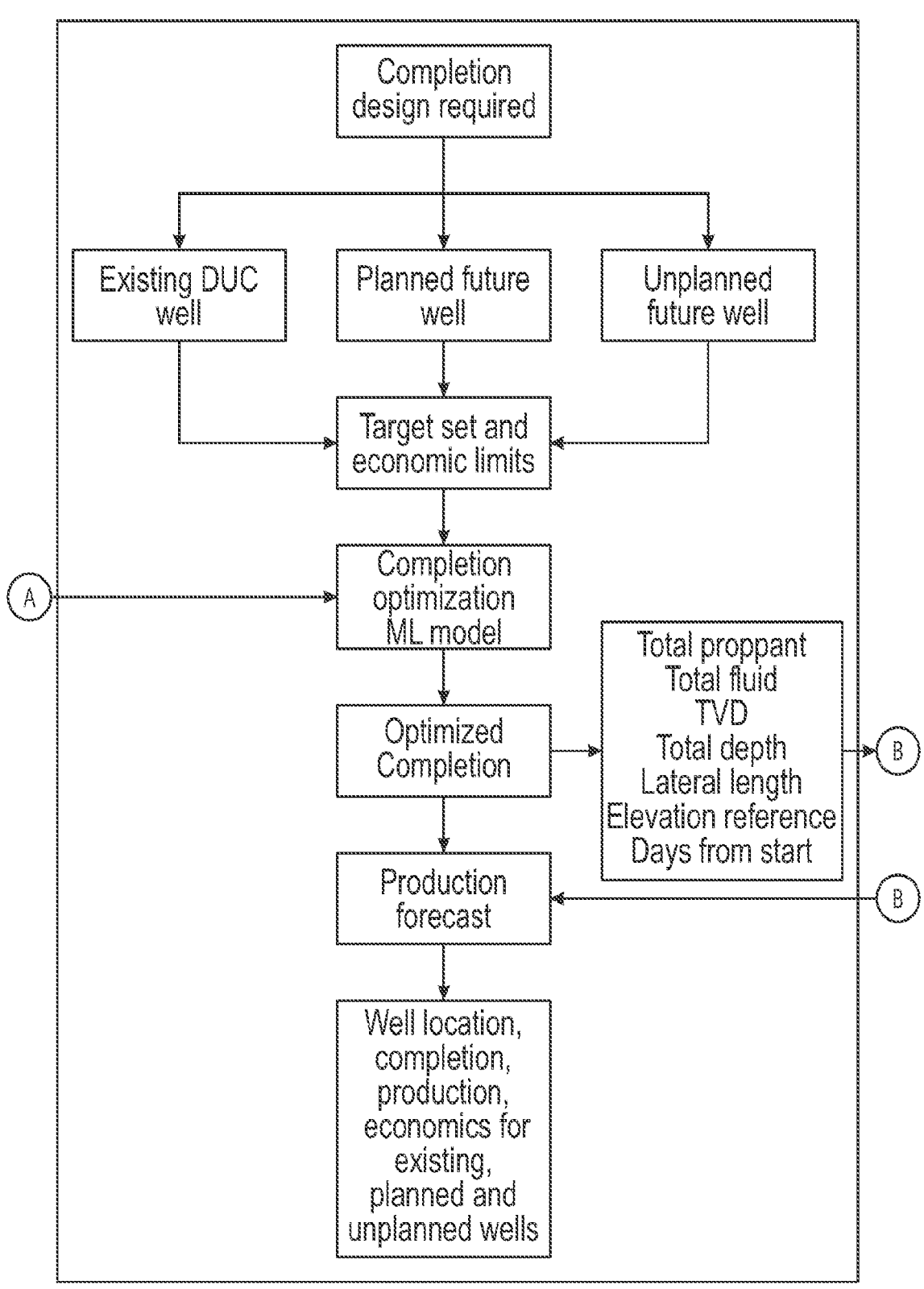
Figure 14C:
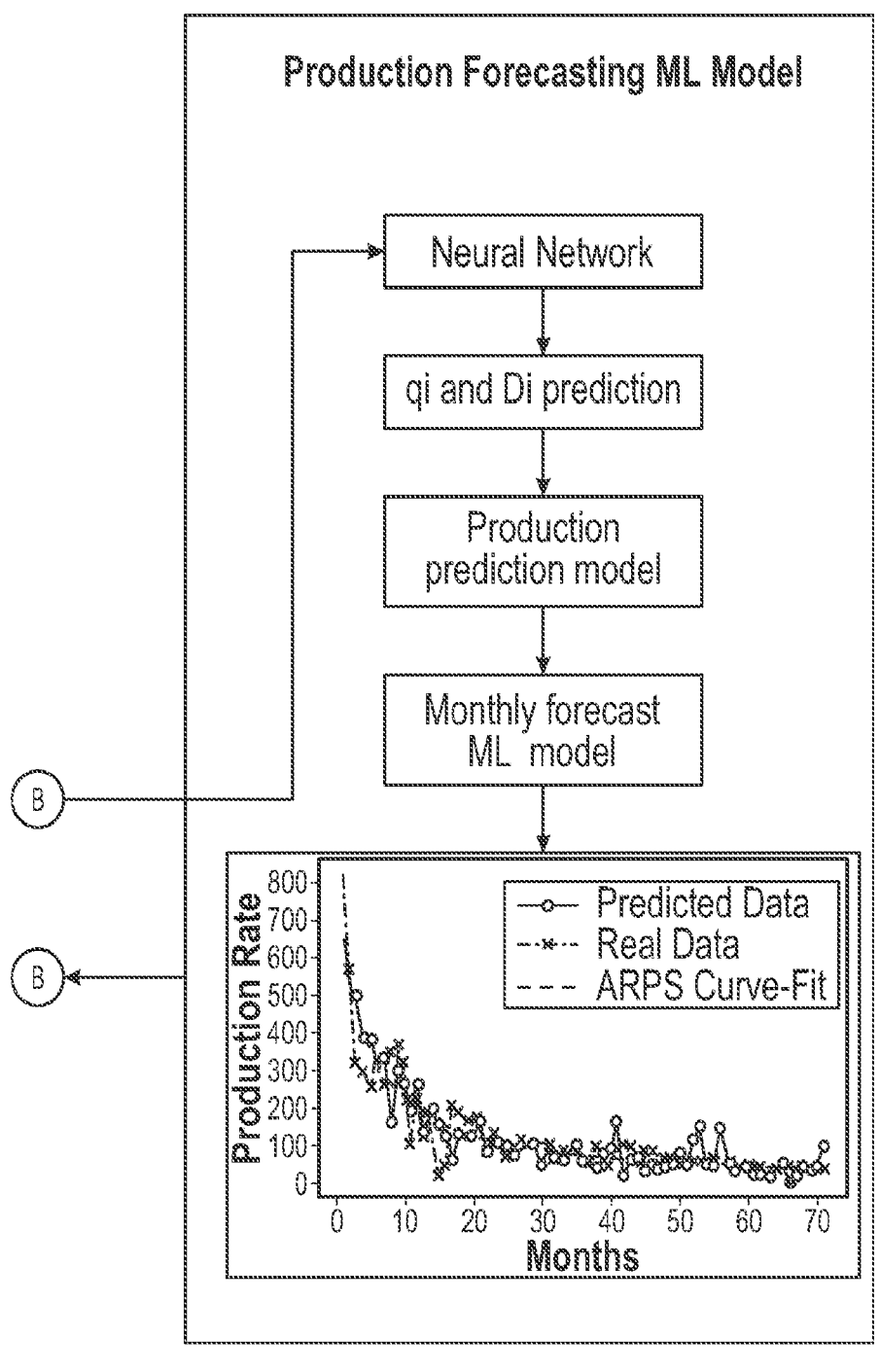

The completion refinement process not only runs for individual wells from the prioritized drilling inventory or DUC wells but may be automated to identify locations in the asset and generate completion parameters to be used. Asset team members can also perform economic calculations and identify how long it will take these wells to turn profitable. The detailed workflow is explained in FIGS. 14 and 15.

For example, the completion refinement process uses data from many (e.g., around 80,000) wells to create a regression model to establish relationship between three-month production (B3), and completion and geological parameters. A linear regression model is used to establish the relationship. The regression may be performed to ensure that the r-square of the model is greater than 0.9. For some embodiments, the inputs to the model are lateral length, proppant mass per foot of lateral length, fluid in gals per foot of lateral length, and well latitude and longitude location. The objective of the model is to predict best three months production from the well based on the inputs (STEP 1 in FIG. 15).

Once the linear regression model is built, it is used in a model to predict the input parameters for a given B3 production. Gradient based approaches may be used. This allows the user to come up with completion parameters for a given three-month production value. There could be multiple solutions to get the desired B3 and in the case the user wants to find multiple solution, the genetic algorithm based optimization approach is used to identify multiple possible solutions (STEP 2 in FIG. 15).

For some embodiments, the user is allowed to fix the location of the well for optimizing completion parameters for drilled but uncompleted wells. In addition, the user can also use the workflow to find a location in a region along with completion parameters by un-constraining the latitude and longitude of the well.

Figure 15:
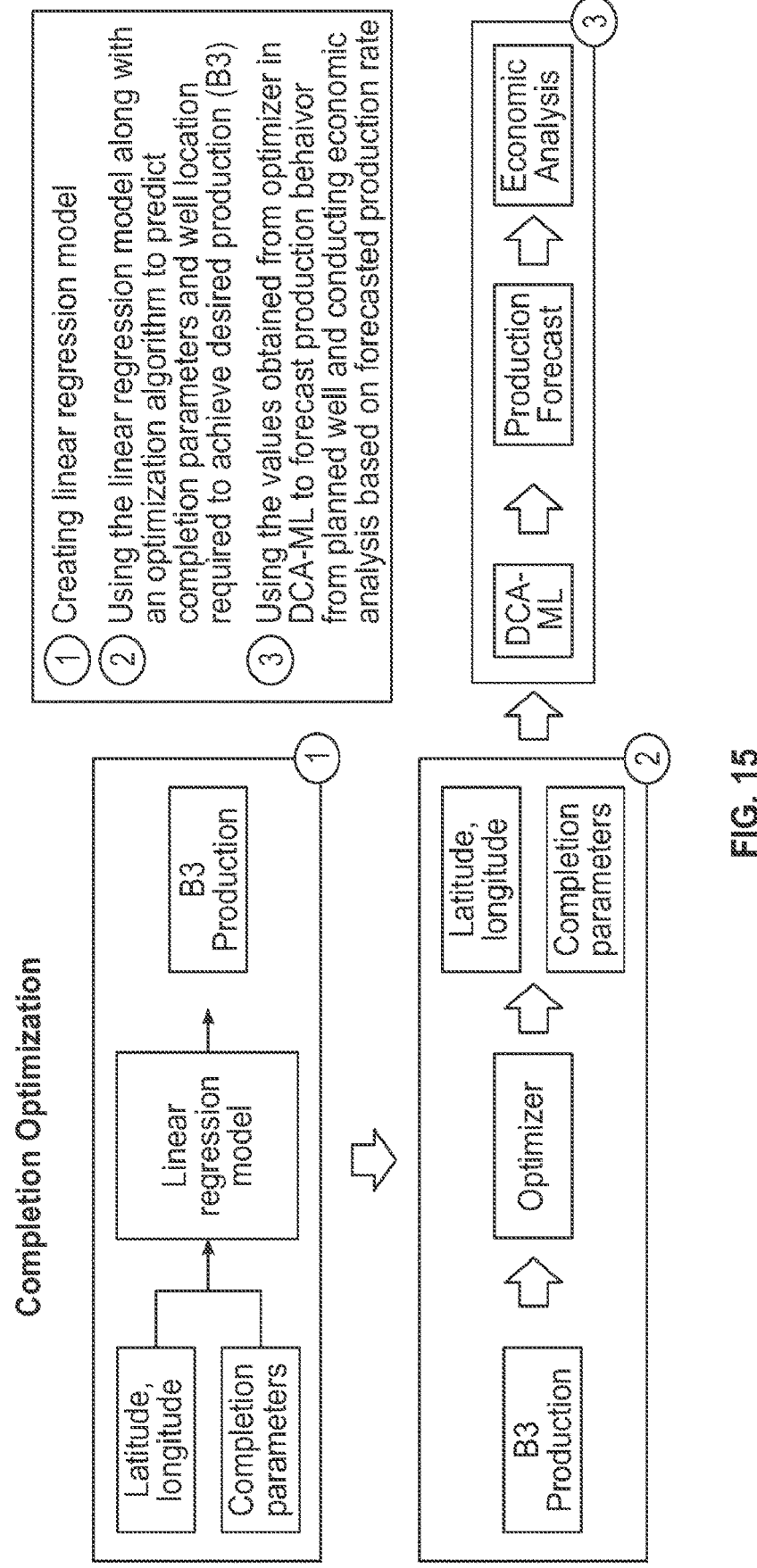
FIG. 15 illustrates another flowchart of the workflow for well completion refinement, according to an embodiment.

The obtained completion design and location are used in DCA-ML to forecast production behavior and the obtained forecasted production rate is used to conduct economic analysis of the well (STEP 3 in FIG. 15). The economic analysis enables long-term cashflow for existing and not yet drilled wells and time to break even. For example, the forecast can enable monthly production predictions.

Using generational analytics workflow (box 5 in FIG. 6), one can also answer questions on well spacing, timing, and location of infill wells by the ability to split and analyze wells from different generations as well as assess future production performance potential. With several years of production and completion data loaded for all wells in the platform, it is possible to use well spacing and time difference between well start times to split hundreds or thousands of wells in multiple generations of wells which may have different completion and production characteristics. These wells can be split in several clusters and analysis can be performed either at a cluster level or at the generation level.

The analysis at cluster level can help understand the impact on existing wells when new wells are completed. It can also show the degradation in production for new wells when the well spacing is below a certain threshold, thus establishing limits for well spacing to obtain optimum drainage from the system overall. At a generational level, the workflow enables understanding of completion practices with every new generation of wells. Type curves for production per generation can tell if a particular generation of wells for a given spacing performs good or poorly. These type curves can be extrapolated with decline curve analysis to estimate long term production forecasts for any generation of planned well. Potential sweet spots in the reservoir can be identified and wells as the most optimum location can thus be planned. Looking at the data from nearby existing wells. For the potential location of well, completions can be refined using the completion refinement ML workflow which can provide the ML based production forecast and economic forecasts. The detailed workflow is shown in FIG. 16.

Well productivity may be affected by factors such as relative timing of completion compared to other wells. For example, a newer well may have the advantage of newer technology. Alternately, a newer well may suffer due to wells drilled nearby (parent-child relationship). Accordingly, the generational analytics may employ a clustering technique that groups wells based on generation (time when drilled). These groups are used to derive common characteristics that are used for completion refinement, production forecasting and new drilling opportunities.

Accordingly, embodiments of the present disclosure may provide rapid unconventional asset performance refinement and analysis for informed decision making with confidence in a fast loop unconventional environment; well performance evaluation for unconventional wells with short production history; automated flow regime identification and modeling for rate transient analysis; data driven completion refinement for planned and DUC wells; automated new well location estimation utilizing production and completion characteristics of existing wells; systems for monitoring, diagnostics and operational decisions for unconventional assets at scale; and well interference pattern and impact identification.

Further, embodiments of the present disclosure may provide a unified solution developed connecting data, enablers including analytical simulation and ML based engines and interconnected domain workflows for well productivity analysis, asset forecast, well ranking, data driven completion refinement and generational analytics for well interference insights; intelligent ML engines developed to automate flow regime identification and evaluate well performance with short production history; live connected digital dashboards always updated with data and results reducing turnaround time in decision making with enhanced accuracy; solutions for completion refinement delivered through ML models leveraging huge amount of existing production and completion data; solutions that account for inter-well communication for closely spaced wells; and solutions that can consume big data efficiently.

Embodiments of the present disclosure may be designed for unconventional assets and/or for conventional reservoirs. Further, the methods may be suitable for rapid on-time analysis and may also be able to receive real-time production data for reservoir surveillance.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 17:
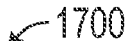
FIG. 17 illustrates a schematic view of a computing system, according to an embodiment.

In some embodiments, any of the methods of the present disclosure may be executed by a computing system. FIG. 17 illustrates an example of such a computing system 1700, in accordance with some embodiments. The computing system 1700 may include a computer or computer system 1701A, which may be an individual computer system 1701A or an arrangement of distributed computer systems. The computer system 1701A includes one or more analysis module(s) 1702 configured to perform various tasks according to some embodiments, such as one or more methods disclosed herein. To perform these various tasks, the analysis module 1702 executes independently, or in coordination with, one or more processors 1704, which is (or are) connected to one or more storage media 1706. The processor(s) 1704 is (or are)

also connected to a network interface 1707 to allow the computer system 1701A to communicate over a data network 1709 with one or more additional computer systems and/or computing systems, such as 1701B, 1701C, and/or 1701D (note that computer systems 1701B, 1701C and/or 1701D may or may not share the same architecture as computer system 1701A, and may be located in different physical locations, e.g., computer systems 1701A and 1701B may be located in a processing facility, while in communication with one or more computer systems such as 1701C and/or 1701D that are located in one or more data centers, and/or located in varying countries on different continents).

A processor can include a microprocessor, microcontroller, processor module or subsystem, programmable integrated circuit, programmable gate array, or another control or computing device.

The storage media 1706 can be implemented as one or more computer-readable or machine-readable storage media. Note that while in the example embodiment of FIG. 17 storage media 1706 is depicted as within computer system 1701A, in some embodiments, storage media 1706 may be distributed within and/or across multiple internal and/or external enclosures of computing system 1701A and/or additional computing systems. Storage media 1706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions or located at a remote site from which machine-readable instructions can be downloaded over a network for execution.

In some embodiments, computing system 1700 contains one or more oilfield completion module(s) 1708. In the example of computing system 1700, computer system 1701A includes the oilfield completion module 1708. In some embodiments, a single oilfield completion module may be used to perform some or all aspects of one or more embodiments of the methods. In alternate embodiments, a plurality of oilfield completion modules may be used to perform some or all aspects of methods.

It should be appreciated that computing system 1700 is only one example of a computing system, and that computing system 1700 may have more or fewer components than shown, may combine additional components not depicted in the example embodiment of FIG. 17, and/or computing system 1700 may have a different configuration or arrangement of the components depicted in FIG. 17. The various components shown in FIG. 17 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1700, FIG. 17), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
receiving oilfield data input for a plurality of wells comprising a first well and a second well, the oilfield data input comprising at least one of total proppant mass, total fluid volume, true vertical depth, total depth, elevation, lateral length, latitude, longitude, first month production, or initial decline rate of production;
projecting a production for the plurality of wells at least in part on the oilfield data input and geological parameters using Rate Transient Analysis (RTA) having an embedded machine learning model (MLM), wherein using the RTA comprises optimizing the embedded MLM using a regression model;
aggregating the production for the plurality of wells by generating a production forecasting MLM incorporating individual forecast models including a separate neural network for each month of the production separately for the first well and the second well and arranging each individual forecast model together to construct a time series model configured to project the production;
ranking the first well and the second well including assigning a ranking to the first well based on the projected production;
completing the first well based on the ranking;
extracting hydrocarbons from the first well at a production rate via hydraulic fracturing using a drilling tool;
automatically adjusting, by a controller and based on the time series model, the production rate to increase an efficiency of the drilling tool;

identifying one or more wells of the plurality of wells including at least one of the first well and the second well for additional completion operations;
determining one or more completion operations to conduct for the one or more wells, wherein the determining the one or more completion operations uses the individual forecast models to forecast results of the one or more completion operations;
computing, for the one or more wells, generational analytics related to well behaviors and based on respective well ages; and
displaying, for the one or more wells, at least one of the generational analytics, recommendations, or projections using a display dashboard.

2. The method of claim 1, wherein the forecast results comprise at least one of a total proppant mass of the hydraulic fracturing, a total fluid volume of the hydraulic fracturing, a proppant mass per foot of lateral length of the hydraulic fracturing, or a fluid in gals per foot of lateral length of the hydraulic fracturing.

3. The method of claim 2, wherein the displaying includes displaying the recommendations, wherein the recommendations include the at least one of the total proppant mass of the hydraulic fracturing, the total fluid volume of the hydraulic fracturing, the proppant mass per foot of lateral length of the hydraulic fracturing, or the fluid in gals per foot of lateral length of the hydraulic fracturing.

4. The method of claim 1, wherein the plurality of wells includes at least one not yet drilled well.

5. The method of claim 4, wherein the displaying includes displaying the projections, wherein the projections include a long-term cashflow for the at least one not yet drilled well.

6. The method of claim 1, wherein the determining includes considering a connectivity of two or more proximal wells of the one or more wells.

7. The method of claim 1, wherein constructing the time series model configured to project the production comprises projecting at least 72 months of the production.

8. The method of claim 1, wherein displaying the at least one of the generational analytics, the recommendations, or the projections comprises displaying, via the display dashboard, the adjusting, the production rate, and the efficiency of the drilling tool.

9. A non-transitory, computer-readable medium storing instructions that, when executed by at least one processor of a computing system, cause the computing system to perform operations, the operations comprising:
receiving oilfield data input for a plurality of wells comprising a first well and a second well, the oilfield data input comprising at least one of total proppant mass, total fluid volume, true vertical depth, total depth, elevation, lateral length, latitude, longitude, first month production, or initial decline rate of production;
projecting a production for the plurality of wells at least in part on the oilfield data input and geological parameters using Rate Transient Analysis (RTA) having an embedded machine learning model (MLM), wherein using the RTA comprises optimizing the embedded MLM using a regression model;
aggregating the production for the plurality of wells by generating a production forecasting MLM incorporating individual forecast models including a separate neural network for each month of production separately for the first well and the second well and arranging each individual forecast model together to construct a time series model configured to project the production;

ranking the first well and the second well including assigning a ranking to the first well based on the projected production;

completing the first well based on the ranking;

extracting hydrocarbons from the first well at a production rate via hydraulic fracturing using a drilling tool;

automatically adjusting, based on the time series model, the production rate to increase an efficiency of the drilling tool;

identifying one or more wells of the plurality of wells including at least one of the first well and the second well for additional completion operations;

determining one or more completion operations to conduct for the one or more wells, wherein the determining the one or more completion operations includes considering a connectivity of two or more proximal wells of the identified wells and uses the individual forecast models to forecast results of the one or more completion operations;

computing, for the one or more wells, at least one of generational analytics related to well behaviors and based on respective well ages; and displaying, for the one or more wells, the generational analytics, recommendations, or projections using a display dashboard.

10. The non-transitory, computer-readable medium of claim 9, wherein the forecast results comprise at least one of a total proppant mass of the hydraulic fracturing, a total fluid volume of the hydraulic fracturing, a proppant mass per foot of lateral length of the hydraulic fracturing, or a fluid in gals per foot of lateral length of the hydraulic fracturing.

11. The non-transitory, computer-readable medium of claim 10, wherein the displaying includes displaying the recommendations, wherein the recommendations include the at least one of the total proppant mass of the hydraulic fracturing, the total fluid volume of the hydraulic fracturing, the proppant mass per foot of lateral length of the hydraulic fracturing, or the fluid in gals per foot of lateral length of the hydraulic fracturing.

12. The non-transitory, computer-readable medium of claim 11, wherein the determining includes considering a connectivity of two or more proximal wells of the one or more wells.

13. The non-transitory, computer-readable medium of claim 9, wherein the plurality of wells includes at least one not yet drilled well.

14. A computing system comprising:

one or more processors; and a memory system including one or more non-transitory, computer-readable media storing instructions that, when executed by at least one of the one or more processors, cause the computing system to perform operations, the operations including:

receiving oilfield data input for a plurality of wells comprising a first well and a second well, the oilfield data input comprising at least one of total proppant mass, total fluid volume, true vertical depth, total depth, elevation, lateral length, latitude, longitude, first month production, or initial decline rate of production;

projecting a production for the plurality of wells at least in part on the oilfield data input and geological parameters using Rate Transient Analysis (RTA) having an embedded machine learning model (MLM), wherein using the RTA comprises optimizing the embedded MLM using a regression model;

aggregating the production for the plurality of wells by generating a production forecasting MLM incorporating individual forecast models including a separate neural network for each month of the production separately for the first well and the second well and arranging each individual forecast model together to construct a time series model configured to project the production;

ranking the first well and the second well including assigning a ranking to the first well based on the projected production;

completing the first well based on the ranking;

extracting hydrocarbons from the first well at a production rate via hydraulic fracturing using a drilling tool;

automatically adjusting, based on the time series model, the production rate to increase an efficiency of the drilling tool;

identifying one or more wells of the plurality of wells including at least one of the first well and the second well for additional completion operations;

determining one or more completion operations to conduct for the one or more wells, wherein the determining the one or more completion operations includes considering connectivity of two or more proximal wells of the identified wells and uses the individual forecast models to forecast results of the one or more completion operations;

computing, for the one or more wells, at least one of generational analytics related to well behaviors and based on respective well ages; and displaying, for the one or more wells, the generational analytics, recommendations, or projections using a display dashboard.

15. The computing system of claim 14, wherein the forecast results comprise at least one of a total proppant mass of the hydraulic fracturing, a total fluid volume of the hydraulic fracturing, a proppant mass per foot of lateral length of the hydraulic fracturing, or a fluid in gals per foot of lateral length of the hydraulic fracturing.

16. The computing system of claim 15, wherein the displaying includes displaying the recommendations, wherein the recommendations include the at least one of the total proppant mass of the hydraulic fracturing, the total fluid volume of the hydraulic fracturing, the proppant mass per foot of lateral length of the hydraulic fracturing, or the fluid in gals per foot of lateral length of the hydraulic fracturing.

17. The computing system of claim 14, wherein the determining includes considering connectivity of two or more proximal wells of the one or more wells.

18. The computing system of claim 14, wherein the plurality of wells includes at least one not yet drilled well.

* * * * *